US012770576B2

(12) United States Patent
Park et al.

(10) Patent No.: US 12,770,576 B2
(45) Date of Patent: Oct. 20, 2026

(54) DISPLAY PANEL AND ELECTRONIC DEVICE INCLUDING THE SAME

(71) Applicant: Samsung Display Co., Ltd., Yongin-Si (KR)

(72) Inventors: Doyeong Park, Yongin-si (KR); Kyungho Kim, Yongin-si (KR); Yunmi Kim, Yongin-si (KR); Hyeongseok Kim, Yongin-si (KR); Dong Hee Shin, Yongin-si (KR); Byungchang Yu, Yongin-si (KR); Jinjoo Ha, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/298,504

(22) Filed: Aug. 13, 2025

(65) Prior Publication Data

US 2026/0120646 A1 Apr. 30, 2026

(30) Foreign Application Priority Data

Oct. 31, 2024 (KR) ........................ 10-2024-0152513

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2310/0286* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 10,276,121 B2 | 4/2019 | Kim et al. | | |
| 2021/0066439 A1 | 3/2021 | Kim et al. | | |
| 2022/0157251 A1 | 5/2022 | Lee | | |
| 2024/0290277 A1 * | 8/2024 | Seo | ...................... | G09G 3/3266 |
| 2026/0051284 A1 * | 2/2026 | Park | ......................... | G09G 3/32 |

FOREIGN PATENT DOCUMENTS

| | | | |
|---|---|---|---|
| KR | 1020220067304 | A | 5/2022 |
| KR | 102489224 | B1 | 1/2023 |
| KR | 102499314 | B1 | 2/2023 |
| KR | 102554398 | B1 | 7/2023 |
| KR | 102591850 | B1 | 10/2023 |
| KR | 102664775 | B1 | 5/2024 |

* cited by examiner

*Primary Examiner* — Ifedayo B Iluyomade
(74) *Attorney, Agent, or Firm* — Innovation Counsel LLP

(57) ABSTRACT

Disclosed is a display panel includes a plurality of pixels arranged along a first direction, a first type stage including a plurality of first buffer circuits that outputs a plurality of first type scan signals to the plurality of pixels, respectively, a second type stage including a plurality of second buffer circuits that outputs a plurality of second type scan signals to the plurality of pixels, respectively, and a plurality of carry clock lines disposed between the first buffer circuits and the second buffer circuits, and extending in the first direction. The plurality of first buffer circuits are arranged along the first direction, and the plurality of second buffer circuits are arranged along the first direction.

20 Claims, 20 Drawing Sheets

DISPLAY PANEL AND ELECTRONIC DEVICE INCLUDING THE SAME

CROSS-REFERENCE TO RELATED APPLICATIONS

This application claims priority under 35 U.S.C. § 119 to Korean Patent Application No. 10-2024-0152513 filed on Oct. 31, 2024, in the Korean Intellectual Property Office, the disclosure of which is incorporated by reference herein in its entirety.

BACKGROUND

Embodiments of the present disclosure described herein relate to a display panel that has a non-display area having a reduced width, and an electronic device including the same.

Each multimedia electronic devices, such as a TV, a mobile phone, a tablet personal computer (PC), a navigation system, a game console, and the like, includes a display panel for displaying an image. According to market demand, research is being conducted to reduce an area (a non-display area or a bezel area), in which an image is not displayed on a display panel.

SUMMARY

Embodiments of the present disclosure provide a display panel that has a non-display area having a reduced width, and an electronic device including the same.

According to an embodiment, a display panel includes a plurality of pixels arranged along a first direction, a first type stage including a plurality of first buffer circuits that outputs a plurality of first type scan signals to the plurality of pixels, respectively, a second type stage including a plurality of second buffer circuits that outputs a plurality of second type scan signals to the plurality of pixels, respectively, and a plurality of carry clock lines disposed between the first buffer circuits and the second buffer circuits, and extending in the first direction, the plurality of first buffer circuits are arranged along the first direction, and the plurality of second buffer circuits are arranged along the first direction.

The display panel may further include a plurality of first type clock lines electrically connected to the first type stage, and a plurality of second type clock lines electrically connected to the second type stage, and the plurality of first type clock lines and the plurality of second type clock lines may be spaced apart from each other in a second direction crossing the first direction, and the plurality of carry clock lines may be disposed between the first type clock lines and the second type clock lines.

The first type stage may be disposed between the plurality of first type clock lines and the plurality of carry clock lines, and the second type stage may be disposed between the plurality of second type clock lines and the plurality of carry clock lines.

The first type stage may further include a first logic circuit that controls operations of the plurality of first buffer circuits, the second type stage may further include a second logic circuit that controls operations of the plurality of second buffer circuits, the plurality of first buffer circuits may be disposed between the plurality of first type clock lines and the first logic circuit, and the plurality of second buffer circuits may be disposed between the plurality of second type clock lines and the second logic circuit.

The plurality of first type clock lines, the first type stage, the plurality of carry clock lines, the second type stage, the plurality of second type clock lines, and the plurality of pixels may be arranged in the second direction.

The display panel may further include a voltage line disposed between the plurality of second type clock lines and the plurality of pixels, and the voltage line may extend along the first direction.

The display panel may further include a voltage line disposed between the first type stage and the second type stage, and the voltage line may extend along the first direction.

The display panel may further include a plurality of signal lines electrically connected to the first type stage and the second type stage, and the plurality of signal lines may be disposed between the plurality of first buffer circuits and the plurality of second buffer circuits.

The display panel may further include a first connection line extending in a second direction crossing the first direction, and a second connection line spaced apart from the first connection line along the second direction, and extending along the second direction, and the first connection line may be electrically connected a first signal line in the plurality of signal lines and the first type stage, and the second connection line may be electrically connected to the first signal line in the plurality of signal lines and the second type stage.

The display panel may further include an integrated logic circuit disposed between the plurality of signal lines and the plurality of clock lines, and that controls operations of the plurality of first buffer circuits and the plurality of second buffer circuits.

The display panel may further include a plurality of first type scan lines electrically connected to the plurality of first buffer circuits in one-to-one correspondence, and a plurality of second type scan lines electrically connected to the plurality of second buffer circuits in one-to-one correspondence, and the plurality of first type scan lines and the plurality of second type scan lines may be electrically connected to the plurality of pixels across an introduction area adjacent to the plurality of pixels.

At least one of the plurality of second type scan lines may be disposed in the introduction area between, a first, first type scan line of the plurality of first type scan lines and a second, first type scan line of the plurality of first type scan lines.

The display panel may further include a data line electrically connected to the plurality of pixels, and a power line electrically connected to the plurality of pixels, each of the plurality of pixels may include a pixel driving circuit, and a light emitting element electrically connected to the pixel driving circuit, and the pixel driving circuit may include a first transistor connected between the power line and the light emitting element, a second transistor connected to the data line and a gate electrode of the first transistor, and a third transistor connected between the light emitting element and a read-out line.

An operation of the second transistor may be controlled by a first type of scan signal in the plurality of first type scan signals, and an operation of the third transistor may be controlled by a second type scan signal in the plurality of second type scan signals.

An operation of the second transistor may be controlled by a first type of scan signal in the plurality of second type scan signals, and an operation of the third transistor may be controlled by a second type of scan signal in the plurality of first type scan signals.

According to an embodiment, an electronic device includes a display panel, having a display area and a non-display area adjacent to the display area, and a data driver electrically connected to the display panel, the display panel includes a plurality of pixels arranged in the display area along a first direction, a data line electrically connected to the plurality of pixels and the data driver, a first type stage disposed in the non-display area, and that outputs a plurality of first type scan signals to the plurality of pixels, and a second type stage disposed in the non-display area, and that outputs a plurality of second type scan signals to the plurality of pixels, and the first type stage and the second type stage are spaced apart from each other in a second direction crossing the first direction.

The first type stage may include a plurality of first buffer circuits, wherein each first buffer circuit in the plurality of first buffer circuits outputs a first type signal in the plurality of first type scan signals respectively, the second type stage may include a plurality of second buffer circuits, wherein each second buffer circuit in the plurality of second buffer circuits is outputs the plurality of second type scan signals, respectively, the plurality of first buffer circuits may be arranged along the first direction, and the plurality of second buffer circuits may be arranged along the first direction.

The display panel may further include a plurality of carry clock lines disposed between the plurality of first buffer circuits and the plurality of second buffer circuits, and extending in the first direction, a plurality of first type clock lines electrically connected to the first type stage, and a plurality of second type clock lines electrically connected to the second type stage, and the first type clock lines and the second type clock lines may be spaced apart from each other in a second direction, and the plurality of carry clock lines may be disposed between the plurality of first type clock lines and the plurality of second type clock lines.

The plurality of first type clock lines, the first type stage, the plurality of carry clock lines, the second type stage, the plurality of second type clock lines, and the plurality of pixels may be sequentially arranged along the second direction, and the display panel may further include a voltage line disposed between the plurality of second type clock lines and the plurality of pixels, and the voltage line extends along the first direction.

The display panel may further include a plurality of signal lines electrically connected to the first type stage and the second type stage, a first connection line extending along the second direction, and a second connection line spaced apart from the first connection line in the second direction and extending along the second direction, the plurality of signal lines may be disposed between the plurality of first buffer circuits and the plurality of second buffer circuits, and the first connection line may be electrically connected to a first signal line in the plurality of signal lines and the first type stage, and the second connection line may be electrically connected to the first signal in the plurality of signal lines and the second type stage.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1A:
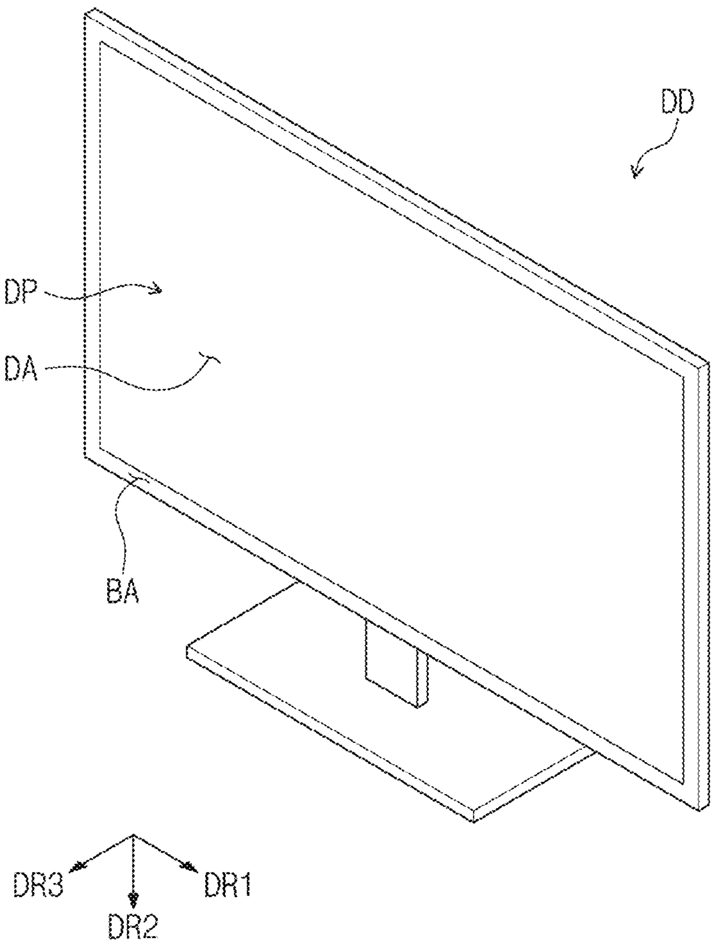
FIG. 1A is a perspective view of an electronic device according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles “a,” “an,” and “the” are singular in that they have a single referent, but the use of the singular form in the specification should not preclude the presence of more than one referent.

Also, the terms “under”, “below”, “on”, “above”, etc. are used to describe the correlation of components illustrated in drawings. The terms are relative concepts, and are described with respect to directions indicated in the drawings.

It will be understood that the terms “include”, “comprise”, “have”, etc. specify the presence of features, numbers, steps, operations, elements, or components, described in the specification, or a combination thereof, not precluding the presence or additional possibility of one or more other features, numbers, steps, operations, elements, or components or a combination thereof.

Terms “part” and “unit” mean a software component or hardware component that performs a specific function. For example, the hardware component may include a field-programmable gate array (FPGA) or an application-specific integrated circuit (ASIC). The software component may refer to executable codes and/or data used by the executable codes in an addressable storage medium. Accordingly, the software components may be, for example, object-oriented software components, class components, and task components, and may include processes, functions, attributes, procedures, subroutines, program code segments, drivers, firmware, microcode, circuits, data, databases, data structures, tables, arrays, or variables.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 1B:
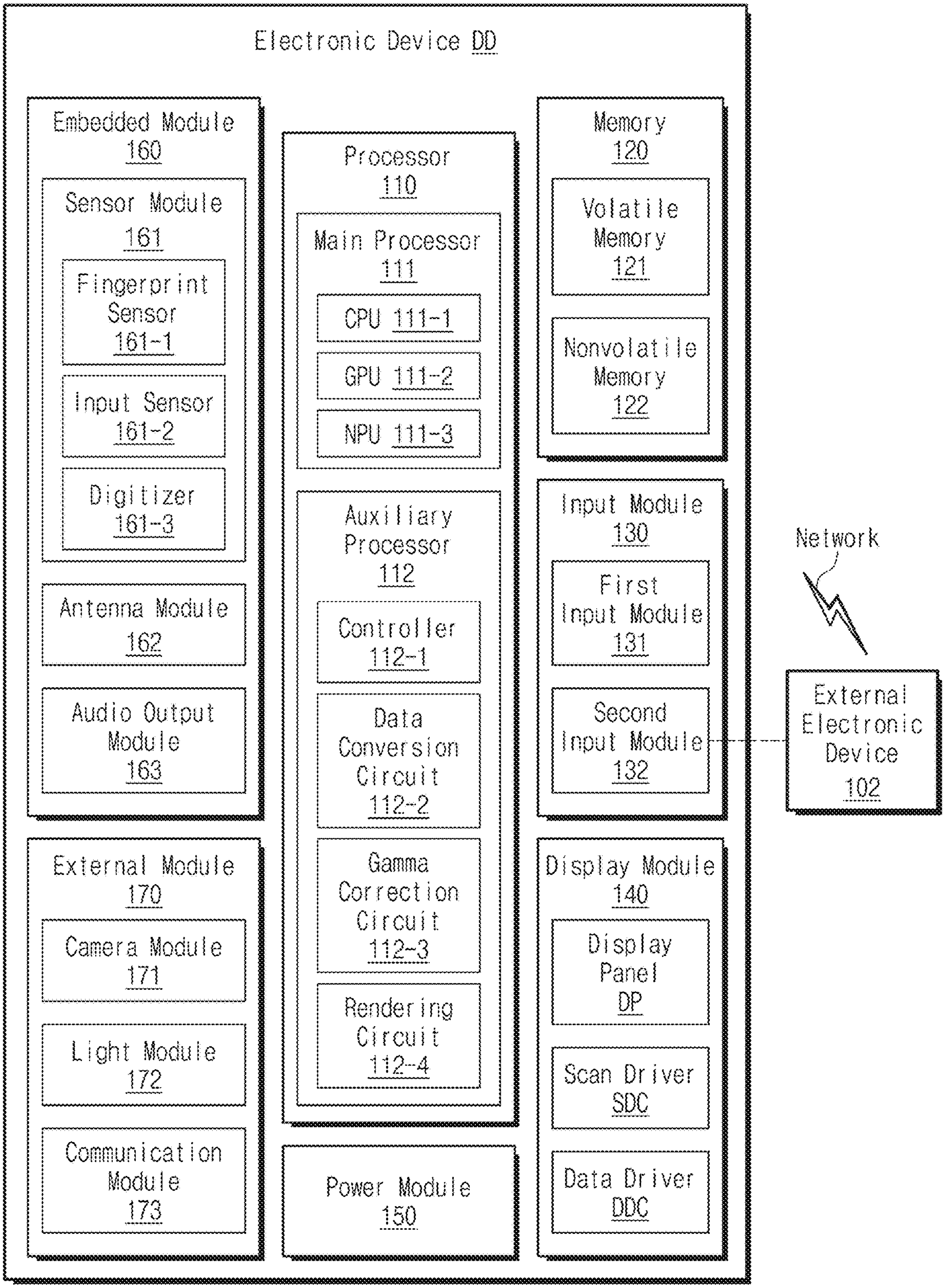
FIG. 1B is a block diagram of an electronic device according to an embodiment of the present disclosure.
Figure 2:
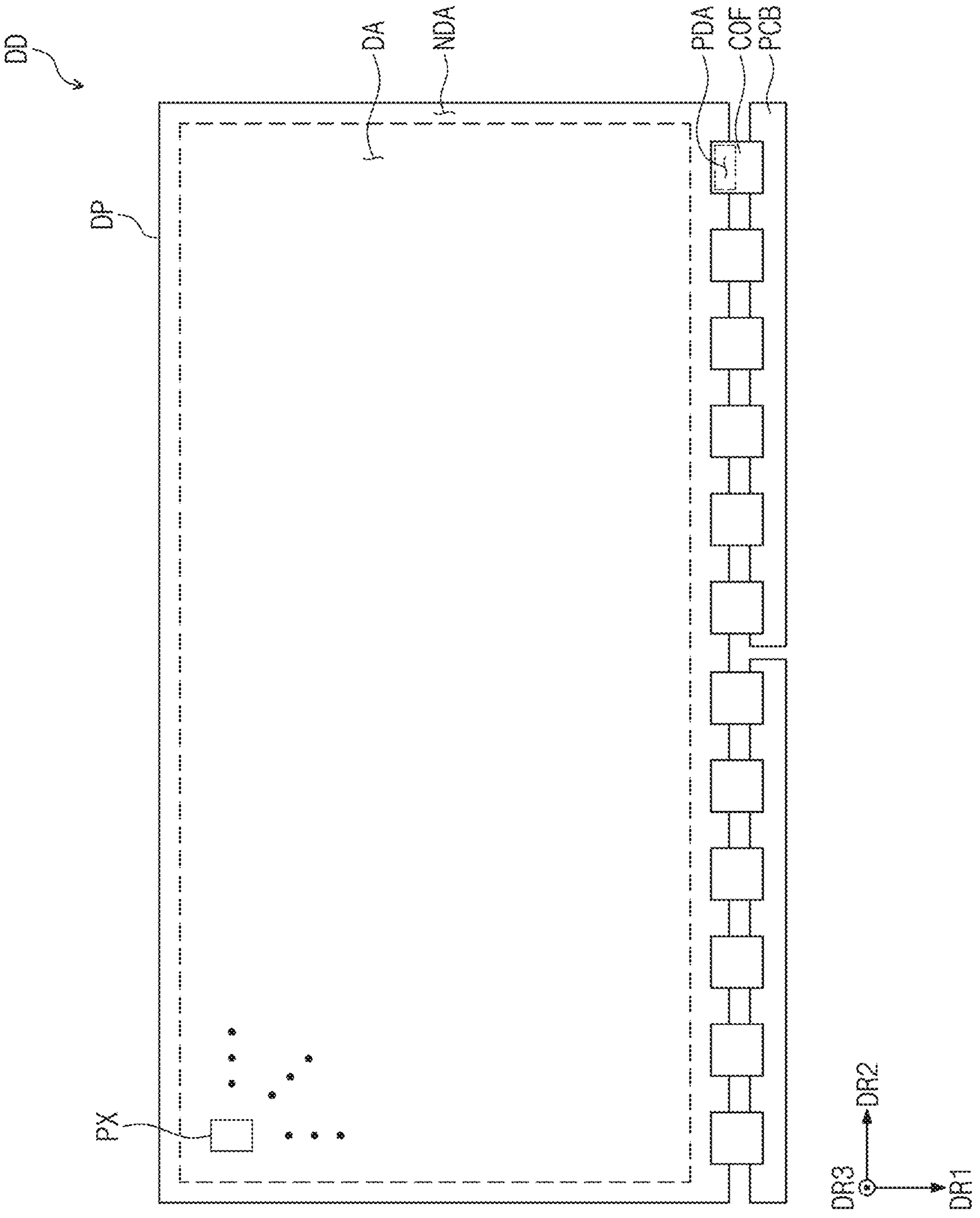
FIG. 2 is a plan view of an electronic device according to an embodiment of the present disclosure.

FIG. 1A is a perspective view of an electronic device DD according to an embodiment of the present disclosure. FIG. 1B is a block diagram of an electronic device DD according to an embodiment of the present disclosure. FIG. 2 is a plan view of an electronic device DD according to an embodiment of the present disclosure.

Referring to FIGS. 1A and 1B, the electronic device DD may be a device that is activated depending on an electrical signal. In addition to large-sized electronic devices, such as televisions, monitors, or external billboards, the electronic device DD may be used in small and medium-sized electronic devices, such as a personal computer, a laptop computer, a personal digital terminal, a car navigation unit, a game console, a portable electronic device, and a camera. Furthermore, these are just presented as embodiments. It should be noted that aspects of the present disclosure are not limited to the types of electronic devices disclosed and the present disclosure is capable of being employed in other electronic devices as long as these do not depart from the concept of the present disclosure. The electronic device DD illustrated in FIG. 1A may be a monitor.

An electronic device DD outputs a variety of information through a display module 140 in an operating system. When a processor 110 executes an application stored in a memory 120, the display module 140 provides the user with application information through a display panel DP. The processor 110 may be one or more processors which may carry out method steps such as execution of an application either individually, as a collective or as a partial collective. For example and without limitation, two processors may execute one step collectively while a third processor executes a second step in a method of operation.

The processor 110 obtains an external input through an input module 130 or a sensor module 161 and executes an application corresponding to the external input. For example, when the user selects a camera icon displayed in the display panel DP, the processor 110 obtains the user input through an input sensor 161-2 and activates a camera module 171. The processor 110 transfers image data corresponding to a photographed image obtained through the camera module 171 to the display module 140. The display module 140 may display an image corresponding to the photographed image through the display panel DP.

As another example, when authentication for personal information is performed in the display module 140, a fingerprint sensor 161-1 obtains the input fingerprint information as input data. The processor 110 compares the input data obtained through the fingerprint sensor 161-1 and authentication data stored in the memory 120 and executes an application depending on a comparison result. The display module 140 may display information executed depending on logic of the application, through the display panel DP.

As another example, when the user selects a music streaming icon displayed in the display module 140, the processor 110 obtains the user input through the input sensor 161-2 and activates a music streaming application stored in the memory 120. When a music play command is input to the music streaming application, the processor 110 activates a sound output module 163 and provides the user with sound information corresponding to the music play command.

The operation of the electronic device DD is briefly described above. Below, a configuration of the electronic device DD will be described in detail. Some of components of the electronic device DD to be described later may be integrally implemented with one component, and the one component may be divided into two or more components.

Referring to FIG. 1B, the electronic device DD may communicate with an external electronic device 102 over a network (e.g., a short-range wireless communication network or a long-range wireless communication network). According to an embodiment, the electronic device DD may include the processor 110, the memory 120, the input module 130, the display module 140, a power module 150, an embedded module (or an internal module) 160, and an external module 170. According to an embodiment, the electronic device DD may not include at least one of the above components or may further include one or more other components. According to an embodiment, some of the above components (e.g., the sensor module 161, an antenna module 162, or the sound output module 163) may be integrated into any other component (e.g., the display module 140).

The processor 110 may execute software to control at least one component (e.g., a hardware or software component) of the electronic device DD connected with the processor 110 and may perform various data processing or operations. According to an embodiment, as at least a part of the data processing or operations, the processor 110 may store a command or data received from any other component (e.g., the input module 130, the sensor module 161, or a communication module 173) in a volatile memory 121, may process the command or data stored in the volatile memory 121, and may store the processed data in a nonvolatile memory 122.

The processor 110 may include a main processor 111 and an auxiliary processor 112. The main processor 111 may include one or more of a central processing unit (CPU) 111-1 or an application processor (AP). The main processor 111 may further include one or more of a graphic processing unit (GPU) 111-2, a communication processor (CP), and an image signal processor (ISP). The main processor 111 may further include a neural processing unit (NPU) 111-3. The neural processing unit may be a processor specialized for processing of an artificial intelligence model, and the artificial intelligence model may be created through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described example. In addition to a hardware structure, the artificial intelligence model may include a software structure. In an embodiment the machine learning model may be a software structure. At least two of the above processing units and processors may be integrally implemented with one component (e.g., a single chip), or each of the above processing units and processors may be implemented with an independent component (e.g., a plurality of chips).

The auxiliary processor 112 may include a controller 112-1. The controller 112-1 may include an interface conversion circuit and a timing control circuit. The controller 112-1 receives an image signal from the main processor 111 and outputs image data obtained by converting a data format of the image signal to a format suitable for the specification of an interface with the display module 140. The controller 112-1 may output various kinds of control signals necessary to drive the display module 140.

The auxiliary processor 112 may further include a data conversion circuit 112-2, a gamma correction circuit 112-3, a rendering circuit 112-4, etc. The data conversion circuit 112-2 may receive image data from the controller 112-1; the data conversion circuit 112-2 may compensate for the image data such that an image is displayed with a desired luminance depending on a characteristic of the electronic device DD or user settings or may convert the image data to reduce power consumption or to compensate for afterimages. The gamma correction circuit 112-3 may convert the image data or the gamma reference voltage such that an image displayed on the electronic device DD has a desired gamma characteristic. The rendering circuit 112-4 may receive the image data from the controller 112-1 and may render the image data in consideration of a pixel arrangement of the display panel DP applied to the electronic device DD. At least one of the data conversion circuit 112-2, the gamma correction circuit 112-3, and the rendering circuit 112-4 may be integrated into any other component (e.g., the main processor 111 or the controller 112-1). At least one of the data conversion circuit 112-2, the gamma correction circuit 112-3, and the rendering circuit 112-4 may be integrated into a data driver DDC to be described later.

The memory 120 may store various data used by at least one component (e.g., the processor 110 or the sensor module 161) of the electronic device DD and input data or output data for commands related thereto. The memory 120 may include at least one of the volatile memory 121 and the nonvolatile memory 122.

The input module 130 may receive a command or data to be used by a component (e.g., the processor 110, the sensor module 161, or the sound output module 163) of the electronic device DD from the outside of the electronic device DD (e.g., the user or the external electronic device 102).

The input module 130 may include a first input module 131 to which a command or data are input from the user and a second input module 132 to which a command or data are input from the external electronic device 102. The first input module 131 may include a microphone, a mouse, a keyboard, a key (e.g., a button), or a pen (e.g., a passive pen or an active pen). The second input module 132 may support a specified protocol capable of connecting to the external electronic device 102 by wire or wirelessly. According to an embodiment, the second input module 132 may include a high definition multimedia interface (HDMI), a universal serial bus (USB) interface, a secure digital (SD) card interface, or an audio interface. The second input module 132 may include a connector capable of being physically connected with the external electronic device 102, for example, an HDMI connector, a USB connector, an SD card connector, or an audio connector (e.g., a headphone connector).

The display module 140 visually provides information to the user. The display module 140 may include the display panel DP, a scan driver SDC, and the data driver DDC. The display module 140 may further include a window, a chassis, and a bracket for protecting the display panel DP.

The display panel DP may include a liquid crystal display panel, an organic light-emitting display panel, or an inorganic light-emitting display panel, and the type of the display panel DP is not particularly limited. The display panel DP may be a rigid type, or a flexible type that may be rolled or folded. The display module 140 may further include a supporter supporting the display panel DP, a bracket, or a heat dissipating member.

The scan driver SDC may be integrated into the display panel DP. For example, the scan driver SDC may include an amorphous silicon TFT gate driver circuit (ASG), a low temperature polycrystalline silicon (LTPS) TFT gate driver circuit, or an oxide semiconductor TFT gate driver circuit (OSG) internalized in the display panel (DP). The scan driver SDC receives a control signal from the controller 112-1 and outputs scan signals to the display panel DP in response to the control signal. According to an embodiment of the present disclosure, an area or a width occupied by the scan driver SDC may be designed to be reduced. Accordingly, the electronic device DD with a reduced width of the bezel area may be provided.

The display panel DP may further include an emission driver. The emission driver outputs a light emitting control signal to the display panel DP in response to the control signal received from the controller 112-1. The emission driver may be separate from the scan driver SDC or may be integrated into the scan driver SDC.

The data driver DDC receives a control signal from the controller 112-1, converts image data into analog voltages (e.g., data voltages) in response to the control signal, and outputs data voltages to the display panel DP.

The data driver DDC may be integrated into other components (e.g., the controller 112-1). The functions of the interface conversion circuit and the timing control circuit of the controller 112-1 described above may be integrated into the data driver DDC. The data driver DDC may be referred to as a data driver or a data driving chip.

The display module 140 may further include an emission driver, a voltage generator, etc. The voltage generator may output various kinds of voltages necessary for driving the display panel DP.

The power module 150 supplies power to the components of the electronic device DD. The power module 150 may include a battery that charges a power supply voltage. The battery may include a primary cell that is not rechargeable, a secondary cell that is rechargeable, or a fuel cell. The power module 150 may include a power management integrated circuit (PMIC). The PMIC supplies power optimized for each of the modules described above and modules to be described later. The power module 150 may include a wireless power transmission/reception member electrically connected with the battery. The wireless power transmission/reception member may include a plurality of antenna radiators that are in the form of a reception coil.

The electronic device DD may further include an embedded module 160 and the external module 170. The embedded module 160 may include the sensor module 161, the antenna module 162, and the sound output module 163. The external module 170 may include the camera module 171, a light module 172, and the communication module 173.

The sensor module 161 may sense an input by a user's body or an input by a pen among the first input module 131 and may generate an electrical signal or a data value corresponding to the input. The sensor module 161 may include at least one or more of the fingerprint sensor 161-1, the input sensor 161-2, and a digitizer 161-3.

The fingerprint sensor 161-1 may generate a data value corresponding to the user's fingerprint. The fingerprint sensor 161-1 may include at least one of an optical fingerprint sensor and a capacitive fingerprint sensor.

The input sensor 161-2 may generate a data value corresponding to coordinate information of the input by the user's body or the input by the pen. The input sensor 161-2 generates a capacitance change due to the input as a data value. The input sensor 161-2 may sense the input by the passive pen or may exchange data with the active pen.

The input sensor 161-2 may measure a biometric signal, such as blood pressure, moisture, or body fat. For example, when the user touches his/her body part to a sensor layer or a sensing panel and does not move during a given time period, the input sensor 161-2 may detect the biometric signal based on a change in an electric field caused by the body part and may output the information desired by the user to the display module 140.

The digitizer 161-3 may generate a data value corresponding to the coordinate information of the input by the pen. The digitizer 161-3 generates the amount of electromagnetic change by the input as a data value. The digitizer 161-3 may sense the input by the passive pen or may exchange data with the active pen.

At least one of the fingerprint sensor 161-1, the input sensor 161-2, and the digitizer 161-3 may be implemented with a sensor layer formed on the display panel DP through a continuous process. The fingerprint sensor 161-1, the input sensor 161-2, and the digitizer 161-3 may be disposed above/on the display panel DP, and at least one of the fingerprint sensor 161-1, the input sensor 161-2, and the digitizer 161-3, for example, the digitizer 161-3 may be disposed below/under the display panel DP.

At least two or more of the fingerprint sensor 161-1, the input sensor 161-2, and the digitizer 161-3 may be integrally formed with one sensing panel through the same process. When they are integrally formed with one sensing panel, the sensing panel may be disposed between the display panel DP and the window disposed above/on the display panel DP. According to one embodiment, the sensing panel may be disposed on the window, and the location of the sensing panel is not specifically limited.

At least one of the fingerprint sensor 161-1, the input sensor 161-2, and the digitizer 161-3 may be embedded in the display panel DP. That is, at least one of the fingerprint sensor 161-1, the input sensor 161-2, and the digitizer 161-3 may be simultaneously formed through a process of forming elements (e.g., a light emitting device and transistors) included in the display panel DP.

In addition, the sensor module 161 may generate an electrical signal or a data value corresponding to an internal state or an external state of the electronic device DD. The sensor module 161 may further include, for example, a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 162 may include one or more antennas to transmit or receive the signal or power to or from an external source. According to an embodiment, the communication module 173 may transmit or receive the signal to or from the external electronic device through the antenna suitable for the communication method. An antenna pattern of the antenna module 162 may be integrated with one component (e.g., the display panel DP) of the display module 140 or the input sensor 161-2.

The sound output module 163 may be a device for outputting a sound signal to the outside of the electronic device DD may include, for example, a speaker used for general purposes such as multimedia playback or recording playback and a receiver used exclusively for receiving calls. According to an embodiment, the receiver and the speaker may be either integrally implemented or separately implemented. A sound output pattern of the sound output module 163 may be integrated with the display module 140.

The camera module 171 may capture image data corresponding to a still image or a video image. According to one embodiment, the camera module 171 may include one or more lenses, an image sensor, or an image signal processor. The camera module 171 may further include an infrared camera capable of measuring the presence or absence of the user, the location of the user, and the line of sight of the user.

The light module 172 may provide a light. The light module 172 may include a light emitting diode or a xenon lamp. The light module 172 may operate in conjunction with the camera module 171 or may operate independently.

The communication module 173 may establish a wired or wireless communication channel between the electronic device DD and the external electronic device 102 and may support communication execution through the established communication channel. The communication module 173 may include one of a wireless communication module, such as a cellular communication module, a short-range wireless communication module, or a global navigation satellite system (GNSS) communication module, and a wired communication module, such as a local area network (LAN) communication module or a power line communication module or may include all thereof. The communication module 173 may communicate with the external electronic device 102 over a short-range communication network such as Bluetooth, Wi-Fi direct, or infrared data association (IrDA) or a long-range communication network, such as a cellular network, an Internet, or a computer network (e.g., a LAN or WAN). Various kinds of communication modules described above may be implemented with one chip or with separate chips, respectively.

The input module 130, the sensor module 161, the camera module 171, etc. may be used to control the operation of the display module 140 in conjunction with the processor 110.

The processor 110 outputs commands or data to the display module 140, the sound output module 163, the camera module 171, or the light module 172 based on the input data received from the input module 130. For example, the processor 110 may generate the image data corresponding to the input data applied through the mouse or the active pen and may output the image data to the display module 140. In an embodiment, the processor 110 may generate command data corresponding to the input data and may output the command data to the camera module 171 or the light module 172. When input data are not received from the input module 130 during a given time period, the processor 110 may switch an operating mode of the electronic device DD to a low-power mode or a sleep mode such that the power consumption of the electronic device DD is reduced.

The processor 110 outputs commands or data to the display module 140, the sound output module 163, the camera module 171, or the light module 172 based on the sensing data received from the sensor module 161. For example, the processor 110 may compare authentication data obtained through the fingerprint sensor 161-1 with authentication data stored in the memory 120 and may then execute an application depending on a comparison result. The processor 110 may execute a command based on the sensing data sensed by the input sensor 161-2 or the digitizer 161-3 or may output image data corresponding to the sensing data to the display module 140. When the sensor module 161 includes a temperature sensor, the processor 110 may receive temperature data associated with the measured temperature from the sensor module 161 and may further perform luminance correction on the image data based on the temperature data.

The processor 110 may receive measurement data about the presence or absence of the user, the location of the user, and the line of sight of the user from the camera module 171. The processor 110 may further perform the luminance correction on the image data based on the measurement data. For example, the processor 110 determines the presence or absence of the user through the input from the camera module 171 may display image data whose luminance is corrected through the data conversion circuit 112-2 or the gamma correction circuit 112-3.

Some of the above components may be connected with each other through a communication scheme between peripheral devices, for example, a bus, a general purpose input/output (GPIO), a serial peripheral interface (SPI), a mobile industry processor interface (MIPI), or a ultra path interconnect (UPI) link and may exchange signals (e.g., commands or data). The processor 110 may communicate with the display module 140 through a given interface. For example, one of the communication methods described above may be used, and the present disclosure is not limited thereto.

According to various embodiments disclosed in the disclosure, the electronic device DD may include various types of devices. The electronic device DD may include, for example, at least one of a portable communication device (e.g., a smartphone), a computer device, a portable multimedia device, a portable medical device, a camera, a wearable device, and home appliances. An electronic device according to an embodiment of the disclosure may not be limited to the above-described electronic devices DD.

Referring to FIGS. 1A and 2, an electronic device DD may include a display panel DP, a connection film COF, and a circuit board PCB.

The display panel DP may be configured to substantially generate an image. The display panel DP may be a light emitting display panel, and for example, the display panel DP may be an organic light emitting display panel, an inorganic light emitting display panel, an organic-inorganic light emitting display panel, a quantum dot display panel, a micro LED display panel, or a nano LED display panel, but is not particularly limited thereto. The display panel DP may have a small and medium-sized size of several inches or tens of inches or less. In an embodiment, the display panel DP may have a large size of several inches or more.

A display area DA and a non-display area NDA may be defined on the display panel DP. The display panel DP may display an image through the display area DA. For example, the display panel DP may include a plurality of pixels PX, and the pixels PX may be disposed on the display area DA. The display area DA may include a surface that is defined by a first direction DR1 and a second direction DR2. The display area DA may display an image in a third direction DR3 that crosses the first direction DR1 and the second direction DR2. The non-display area NDA may surround the display area DA.

The bezel area BA of the electronic device DD may cover at least a portion of the non-display area NDA of the display panel DP. The bezel area BA may cover the entire non-display area NDA or a portion of the non-display area NDA. When the area of the non-display area NDA is reduced, the area of the bezel area BA may also be reduced.

A plurality of connection films COF may be provided. A driver for driving the display panel DP, for example, a data driver DDC, may be mounted on each of the connection films COF. The plurality of connection films COF may be coupled to the non-display area NDA of the display panel DP. For example, the connection films COF may be attached to one side of the display panel DP. In an embodiment of the present disclosure, the connection films COF may be coupled to a pad area PDA of the display panel DP. The pad area PDA may be defined in the non-display area NDA of the display panel DP. The connection films COF and the display panel DP may be coupled to each other by an anisotropic conductive film ACF, but are not limited thereto.

A plurality of circuit boards PCB may be provided. Each of the circuit boards PCB may be electrically connected to the display panel DP through a corresponding portion of the connection films COF. A chip, for example, the processor 110 for controlling the operation of the display panel DP, may be mounted on the circuit board PCB.

Although six connection films COF are illustrated in FIG. 2, the present disclosure is not limited thereto. Although two circuit boards PCB are illustrated in FIG. 2, the present disclosure is not limited thereto. For example, the number of the connection films COF and the number of the circuit boards PCB may vary depending on the resolution of the display panel DP, the size of the display panel DP, and the specification of the data driver.

Figure 3:
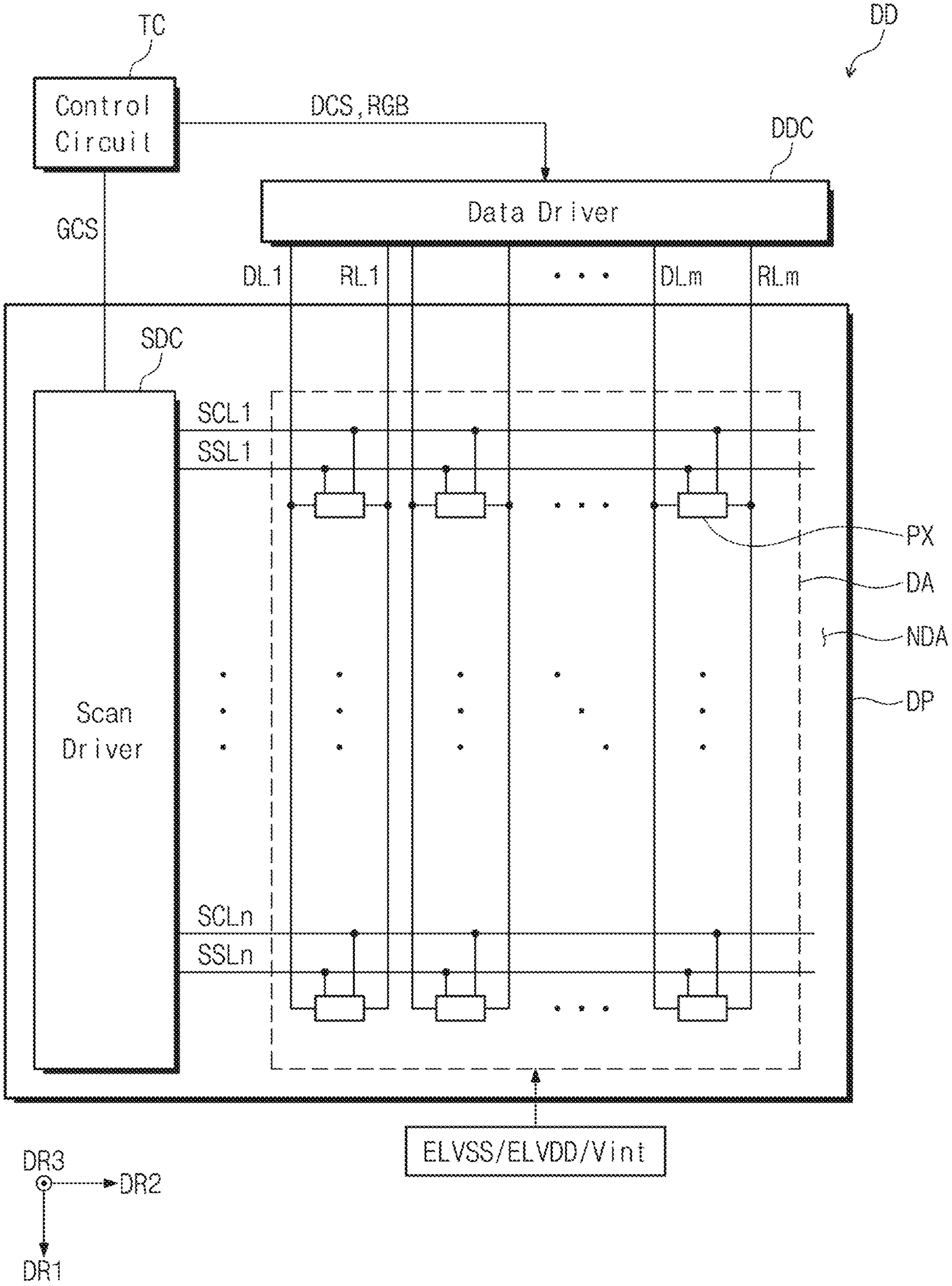
FIG. 3 is a block diagram of an electronic device according to an embodiment of the present disclosure.

FIG. 3 is a block diagram of an electronic device DD according to an embodiment of the present disclosure.

Referring to FIGS. 2 and 3, an electronic device DD may include a display panel DP, a scan driver SDC, a data driver DDC, and a control circuit TC.

The display panel DP includes a display area DA, in which an image is displayed, and a non-display area NDA that is disposed outside the display area DA. A plurality of pixels PX may be disposed in the display area DA. A scan driver SDC for driving pixels PX may be disposed in the non-display area NDA.

The scan driver SDC may be directly formed on the base layer through a photolithography process. For example, the scan driver SDC may be formed with the pixel driving circuit through a process of forming the pixel driving circuit of the pixels PX.

The control circuit TC controls driving of the scan driver SDC and the data driver DDC. The control circuit TC generates image data RGB by converting the data formats of the input image signals to match the interface specification with the data driver DDC. The control circuit TC outputs the image data RGB and various control signals DCS and GCS. The control circuit TC may correspond to the controller 112-1 of FIG. 1B.

The scan driver SDC receives a first control signal GCS from the control circuit TC. The first control signal GCS may include a vertical start signal for starting an operation of the scan driver SDC, a clock signal for determining when to output the signals, and the like. The scan driver SDC may output a plurality of scan signals to a plurality of scan lines SCL1-SCLn and SSL1-SSLn. "n" may be an integer that is greater than or equal to 2. The scan driver SDC may be referred to as a gate driver.

The data driver DDC receives a second control signal DCS and an image data RGB from the control circuit TC. The data driver DDC converts the image data RGB into data signals and outputs the data signals to a plurality of data lines DL1 to DLm. "m" may be an integer that is equal to or greater than 2. The data signals are analog voltages corresponding to a gray value of the image data RGB. The data driver DDC may be provided in the form of a driving chip and mounted on the connection films COF illustrated in FIG. 2, may be mounted on the circuit boards PCB, or may be mounted on a non-display area NDA of the display panel DP.

The display panel DP may include a plurality of scan lines SCL1 to SCLn and SSL1 to SSLn, a plurality of data lines DL1 to DLm, a plurality of read-out lines RL1 to RLm, and a plurality of pixels PX.

The scan lines SCL1-SCLn and SSL1-SSLn may be arranged along the first direction DR1, and each of the scan lines SCL1-SCLn and SSL1-SSLn may extend in the second direction DR2 that crosses the first direction DR1. The scan lines SCL1-SCLn and SSL1-SSLn may include first type scan lines SCL1-SCLn and second type scan lines SSL1-SSLn. The first type scan lines SCL1-SCLn may be referred to as first scan lines, write scan lines, or first gate lines, and the second type scan lines SSL1-SSLn may be referred to as second scan lines, initialization scan lines, sensing scan lines, or second gate lines.

The data lines DL1 to DLm may be arranged along the second direction DR2, and each of the data lines DL1 to DLm may extend in the first direction DR1. The read-out lines RL1 to RLm may be arranged along the second direction DR2, and each of the read-out lines RL1 to RLm may extend in the first direction DR1. The data lines DL1 to DLm and the read-out lines RL1 to RLm may cross the scan lines SCL1 to SCLn and SSL1 to SSLn to be insulated.

Each of the pixels PX may be connected to corresponding first type of scan line and second type of scan line, among the scan lines SCL1 to SCLn and SSL1 to SSLn, a corresponding data line, among the data lines DL1 to DLm, and a corresponding read-out line, among the read-out lines RL1 to RLm. For example, the pixels PX arranged in a first row may be connected to a first, first type scan line SCL1 and a first, second type scan line SSL1, and the pixels PX arranged in an n-th row may be connected to an n-th first type scan line SCLn and an n-th second type scan line SSLn. The pixels PX arranged in the first column may be connected to a first data line DL1 and a first read-out line RL1, and the pixels PX arranged in the m-th column may be connected to an m-th data line DLm and an m-th read-out line RLm. However, this is only an example, and the connection relationship between the pixels PX and the scan lines SCL1 to SCLn and SSL1 to SSLn, the data lines DL1 to DLm, and the read-out lines RLm is not limited thereto.

The display panel DP receives a first power voltage ELVDD and a second power voltage ELVSS. The first power voltage ELVDD may be provided to the pixels PX. The display panel DP may receive an initialization voltage Vint. The initialization voltage Vint may be provided to the pixels PX.

Figure 4:
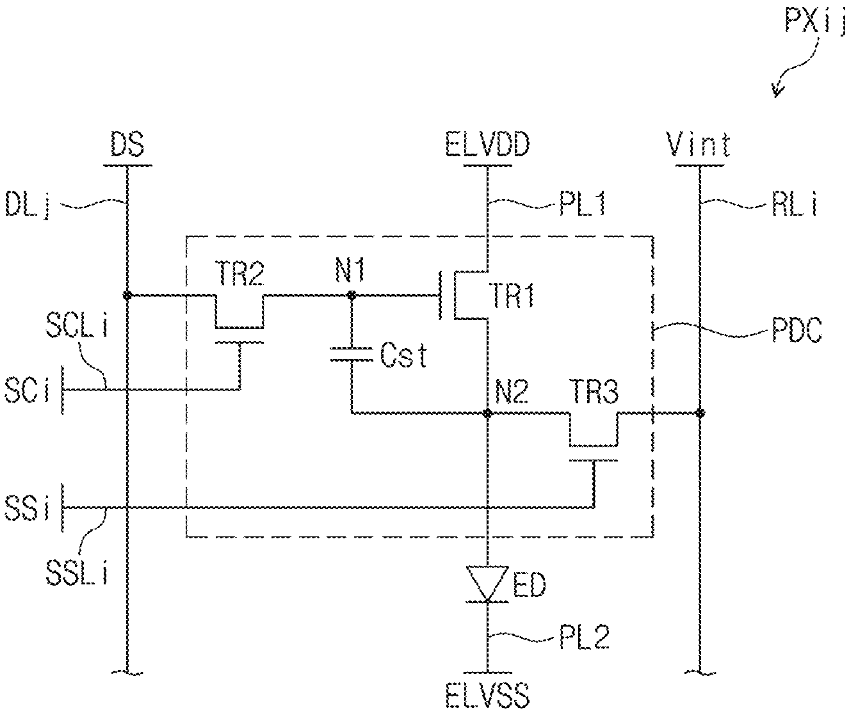
FIG. 4 is an equivalent circuit diagram of a pixel according to an embodiment of the present disclosure.

FIG. 4 is an equivalent circuit diagram of a pixel PXij, according to an embodiment of the present disclosure.

An equivalent circuit diagram of one pixel PXij, among a plurality of pixels PX (see FIG. 3), is illustrated in FIG. 4 by way of example. Because each of the plurality of pixels PX has the same circuit structure, a description of a circuit structure of the pixel PXij is equally applicable for each of the remaining pixel PX. For Pixel PXij, "i" may be an integer that is equal to or greater than 1 and equal to or less than "n", and "j" may be an integer that is equal to or greater than 1 and equal to or less than "m".

Referring to FIG. 4, the pixel PXij includes a light emitting element ED and a pixel driving circuit PDC. The pixel PXij may be connected to i-th scan lines SCLi and SSLi, among scan lines SCL1 to SCLn and SSL1 to SSLn, a j-th data line DLi, among data lines DL1 to DLm, and a j-th read-out line RLi, among read-out lines RL1 to RLm. The i-th scan lines SCLi and SSLi may include an i-th first type scan line SCLi and an i-th second type scan line SSLi.

The pixel driving circuit PDC may include a first transistor TR1, a second transistor TR2, a third transistor TR3, and a capacitor Cst. The configuration of the pixel driving circuit PDC according to the present disclosure is not limited to the embodiment illustrated in FIG. 4. The pixel driving circuit PDC illustrated in FIG. 4 is only an example, and the configuration of the pixel driving circuit PDC may be modified and implemented. For example, the pixel driving circuit PDC may further include at least one transistor and at least one capacitor.

In an embodiment of the present disclosure, each of the first transistor TR1, the second transistor TR2, and the third transistor TR3 is described as an N-type thin film transistor. However, the present disclosure is not limited thereto. For example, at least any one of the first transistor TR1, the second transistor TR2, and the third transistor TR3 may be a P-type thin film transistor.

Furthermore, each of the first transistor TR1, the second transistor TR2, and the third transistor TR3 may be a transistor having an oxide semiconductor layer. However, the present disclosure is not particularly limited thereto. For example, at least one of the first transistor TR1, the second transistor TR2, and the third transistor TR3 may be a transistor having a low-temperature polycrystalline silicon (LTPS) semiconductor layer.

The first transistor TR1 may be electrically connected between a first power line PL1 and the light emitting element ED. The first transistor TR1 may include a gate electrode that is connected to a first node N1, a first electrode that is electrically connected to the first power line PL1, and a second electrode that is connected to the light emitting element ED. The light emitting element ED and the first transistor TR1 may be electrically connected to each other at a second node N2. The first power voltage ELVDD may be provided as a pixel PXij through the first power line PL1.

The first transistor TR1 may control the amount of current that flows to the light emitting element ED in response to the voltage of the first node N1. For example, the first transistor TR1 may be turned on when a voltage (i.e., a gate-source voltage) between the first node N1 and the second node N2 is higher than a threshold voltage.

The second transistor TR2 may be electrically connected between a j-th data line DLj and the first node N1. The second transistor TR2 may include a gate electrode that is connected to the i-th first type scan line SCLi, a first electrode that is connected to the j-th data line DLj, and a second electrode that is connected to the first node N1.

The second transistor TR2 may transmit a data voltage DS received from the j-th data line DLj to the first node N1 in response to an i-th first type scan signal SCi provided to the i-th first type scan line SCLi. For example, the second transistor TR2 may be turned on when the i-th first type scan signal SCi is at a logic high level.

The third transistor TR3 may be electrically connected between the second node N2 and the j-th read-out line RLi. The third transistor TR3 may include a gate electrode that is connected to the i-th second type scan line SSLi, a first electrode that is connected to a j-th read-out line RLj, and a second electrode that is connected to the second node N2. The third transistor TR3 may connect the second node N2 and the j-th read-out line RLj in response to an i-th second type scan signal SSi provided to the i-th second type scan line SSLi. For example, the third transistor TR3 may be turned on when the i-th second type scan signal SSi has a logic high level.

According to an embodiment of the present disclosure, during an image display operation, the third transistor TR3 may transmit the initialization voltage Vint to the second node N2 in response to the second type scan signal SSi. That is, when the third transistor TR3 is turned on, the second electrode of the first transistor TR1 may be reset to the initialization voltage Vint.

During the sensing operation, the third transistor TR3 may transmit a sensing current corresponding to the voltage of the second node N2 to the j-th read-out line RLj in response to the second type scan signal SSi. The control circuit TC (refer to FIG. 3) may receive the sensing current to determine a threshold voltage or mobility of the first transistor TR1 and generate compensated image data RGB.

The capacitor Cst may be connected between the first node N1 and the second node N2. When the data voltage DS is supplied, the initialization voltage Vint may be supplied to the second node N2. In this case, a differential voltage between the data voltage DS and the initialization voltage Vint may be stored in the capacitor Cst. Whether the first transistor TR1 is turned on or off may be determined depending on a voltage stored in the capacitor Cst.

The light emitting element ED may be connected between the second node N2 and a second power line PL2. A second power voltage ELVSS may be applied to the second power line PL2. The light emitting element ED may include a first electrode (e.g., an anode), a second electrode (e.g., a cathode), and a light emitting layer between the first electrode and the second electrode. For example, the first electrode may be connected to a second node N2, and the second electrode may be connected to a second power line PL2. The light emitting element ED may generate light having a specific luminance corresponding to the amount of current provided from the first transistor TR1.

Figure 5:
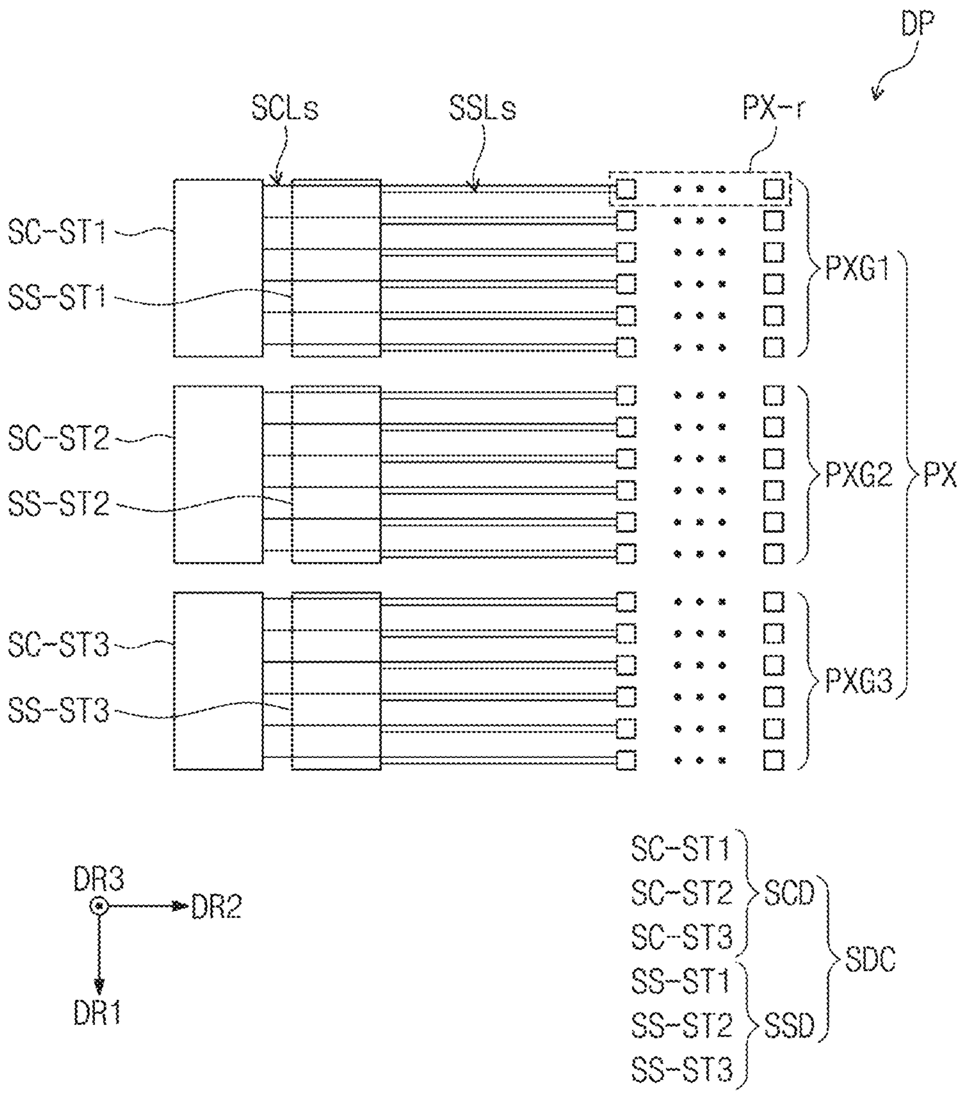
FIG. 5 is a block diagram illustrating some configurations of an electronic device according to an embodiment of the present disclosure.

FIG. 5 is a block diagram illustrating some components of the display panel DP according to an embodiment of the present disclosure.

Referring to FIG. 5, a portion of the scan driver SDC and the pixels PX are illustrated. The scan driver SDC may include a first type scan driver SCD and a second type scan driver SSD. The first type scan driver SCD includes a plurality of first type stages SC-ST1, SC-ST2, and SC-ST3, and the second type scan driver SSD may include a plurality of second type stages SS-ST1, SS-ST2, and SS-ST3.

According to an embodiment of the present disclosure, the first type stages SC-ST1, SC-ST2, and SC-ST3 may be arranged along the first direction DR1, and the second type stages SS-ST1, SS-ST2, and SS-ST3 may be arranged along the first direction DR1. Furthermore, the first type stages SC-ST1, SC-ST2, and SC-ST3 and the second type stages SS-ST1, SS-ST2, and SS-ST3 may be arranged to be spaced apart from each other in the second direction DR2 that crosses the first direction DR1.

According to an embodiment of the present disclosure, the first type stages SC-ST1, SC-ST2, and SC-ST3 and the second type stages SS-ST1, SS-ST2, and SS-ST3 may be arranged to be spaced apart from each other in a direction that crosses the arrangement direction of a pixel rows PX-r. In this case, lines for transmitting a signal to the first type stages SC-ST1, SC-ST2, and SC-ST3 and lines for transmitting a signal to the second type stages SS-ST1, SS-ST2, and SS-ST3 may be divided into left and right areas in the second direction DR2, that is, on the drawing. Accordingly, a design for reducing a length of a line used in the scan driver SDC or reducing a width of the scan driver SDC in the second direction DR2 may be facilitated.

According to an embodiment of the present disclosure, the first type stages SC-ST1, SC-ST2, and SC-ST3 may be electrically connected to a plurality of first type scan lines SCLs, respectively. Furthermore, the second type stages SS-ST1, SS-ST2, and SS-ST3 may be electrically connected to a plurality of second type scan lines SSLs, respectively. For example, one first type stage SC-ST1 may be connected to “Y” first type scan lines SCLs to output “Y” first type scan signals, and one second type stage SS-ST1 may be connected to “Y” second type scan lines SSLs to output “Y” second type scan signals. “Y” may be an integer of 2 or more.

In FIG. 5, it is illustrated as an example that one first type stage SC-ST1 is electrically connected to six first type scan lines SCLs and one second type stage SS-ST1 is electrically connected to six second type scan lines SSLs, but the present disclosure is not particularly limited thereto. For example, two or more first type scan lines SCLs may be connected to one first type stage SC-ST1, and two or more second type scan lines SSLs may be connected to one second type stage SS-ST1.

According to an embodiment of the present disclosure, the plurality of pixels PX may be arranged in the first direction DR1 and the second direction DR2. Among the plurality of pixels PX, pixels PX-r (hereinafter, referred to as pixel rows) of a row that is arranged in the second direction DR2 may be connected to one first type stage SC-ST1 and one second type stage SS-ST1. Furthermore, the pixels PX include pixels PXG1 (hereinafter, first pixel groups) of a “Y” that is row arranged in the first direction DR1, and the first pixel groups PXG1 may be connected to one first type stage SC-ST1 and one second type stage SS-ST1.

The first pixel groups PXG1 including six pixel rows PX-r may be connected to the first, first type stage SC-ST1 and the first, second type stage SS-ST1. The second pixel groups PXG2, including the next six pixel rows, PX-r may be connected to the second, first type stage SC-ST2 and the second, second type stage SS-ST2. The third pixel groups PXG3, including the next six pixel rows PX-r, may be connected to the third, first type stage SC-ST3 and the third, second type stage SS-ST3.

According to an embodiment of the present disclosure, one stage, for example, the first type stage SC-ST1, may control an operation of a pixel group including two or more pixel rows PX-r, for example, the first pixel group PXG1. That is, the total number of stages may be smaller than the number of rows of the pixels PX. Accordingly, the number of transistors, capacitors, and lines (for example, clock lines) disposed in the non-display area NDA (see FIG. 3) may be reduced. As a result, the width of the non-display area NDA (see FIG. 3) of the display panel DP (see FIG. 2) may be reduced.

Figure 6A:
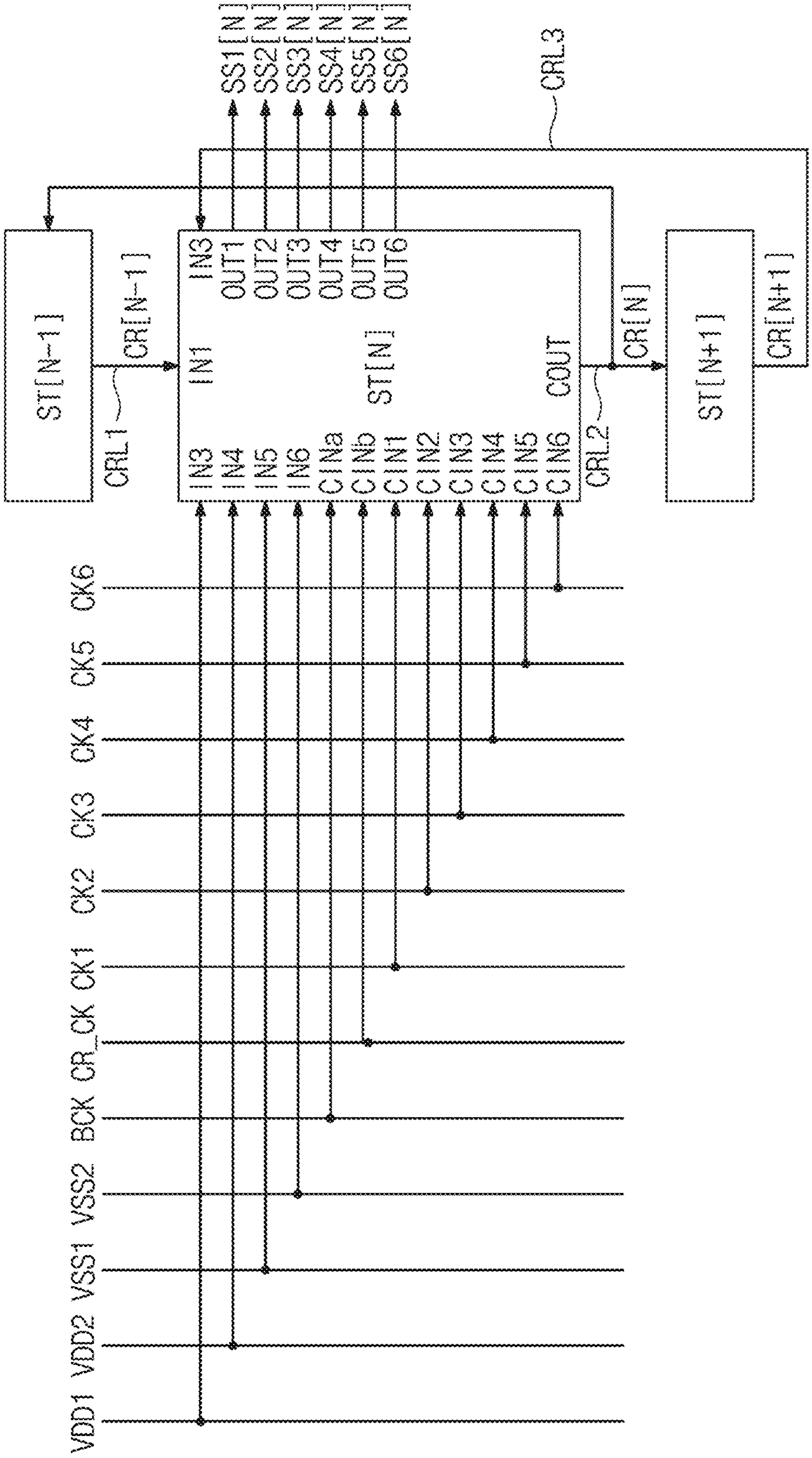
FIG. 6A is a view illustrating a scan driver according to an embodiment of the present disclosure.
Figure 6B:
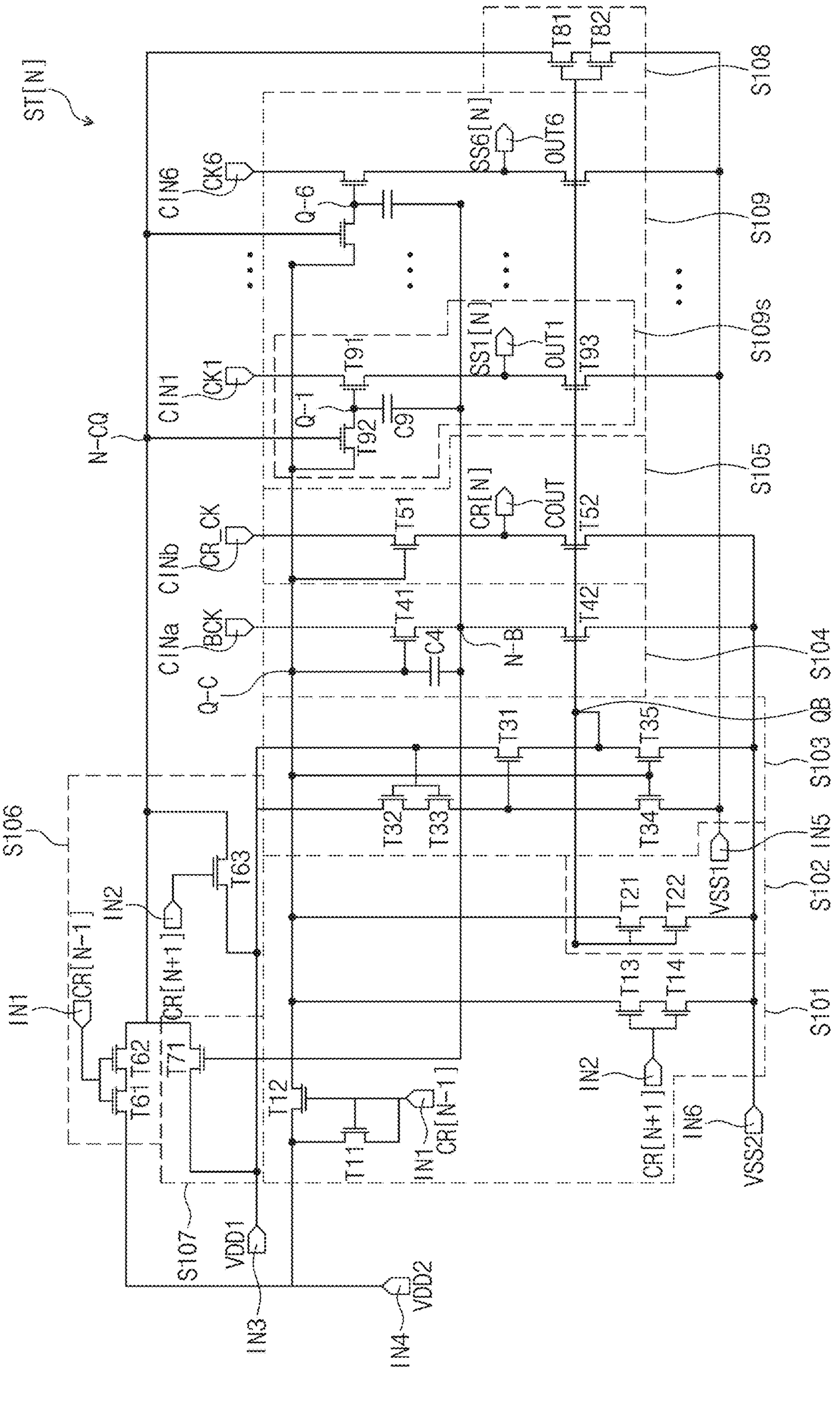
FIG. 6B is an equivalent circuit diagram illustrating one stage according to an embodiment of the present disclosure.

FIG. 6A is a view illustrating a scan driver SDC according to an embodiment of the present disclosure. FIG. 6B is an equivalent circuit diagram illustrating a stage ST[N] according to an embodiment of the present disclosure.

Three stages ST[N−1], ST[N], and ST[N+1] are illustrated in FIG. 6A by way of example. "N" may be an integer that is equal to or greater than 2. Three stages ST[N−1], ST[N], and ST[N+1] may be first type stages SC-ST1, SC-ST2, and SC-ST3, (see FIG. 5) or second type stages SS-ST1, SS-ST2, and SS-ST3 (see FIG. 5).

An equivalent circuit diagram of one stage ST[N] is illustrated in FIG. 6B by way of example. Because the remaining stages ST[N−1] and ST[N+1] also include substantially the same configuration, repeated descriptions thereof are omitted. The configuration of one stage ST[N] according to the present disclosure is not limited to the embodiments illustrated in FIG. 6B. One stage ST[N] illustrated in FIG. 6B is merely an example, and the circuit configuration of one stage ST[N] may be modified and carried out.

Referring to FIG. 6A, the stages ST[N−1], ST[N], and ST[N+1] may be sequentially referred to as a first stage ST[N−1], the second stage ST[N], and a third stage ST[N+1]. For the sake of clarity, the second stage ST[N] may be referred to as a reference stage or a stage, the first stage ST[N−1] may be referred to as a first peripheral stage, and the third stage ST[N+1] may be referred to as a second peripheral stage. Hereinafter, the second stage ST[N] may be referred to as a stage.

The stage ST[N] may include first to sixth input terminals IN1, IN2, IN3, IN4, IN5, and IN6, first to sixth clock terminals CIN1, CIN2, CIN3, CIN4, CIN5, and CIN6, a first control terminal CINa, a second control terminal CINb, first to sixth output terminals OUT1, OUT2, OUT3, OUT4, OUT5, and OUT6, and a carry output terminal COUT.

A first input terminal IN1 of the stage ST[N] may receive a carry signal CR[N−1] output from the previous stage, for example, the first stage ST[N−1]. When the stage ST[N] is the first stage, the first input terminal IN1 may receive a start signal that is output from the dummy stage before the first stage.

The carry signal CR[N−1] may be referred to as a previous carry signal or a first carry signal, and hereinafter, it will be referred to as a first carry signal CR[N−1]. The first stage ST[N−1] and the stage ST[N] may be electrically connected to a first carry line CRL1, and the first carry line CRL1 may also be referred to as a first peripheral carry line. The first carry signal CR[N−1] generated at the first stage ST[N−1] may be transmitted to the stage ST[N] through the first carry line CRL1.

A second input terminal IN2 of the stage ST[N] may receive a carry signal CR[N+1] that is output from the next stage, for example, the third stage ST[N+1]. When the stage ST[N] is the last stage, the second input terminal IN2 may receive a carry signal that is output from the dummy stage following the last stage.

The carry signal CR[N+1] may be referred to as a next carry signal or a third carry signal, and hereinafter, referred to as a third carry signal CR[N+1]. The third stage ST[N+1] and the stage ST[N] may be electrically connected to a third carry line CRL3, and the third carry line CRL3 may be referred to as a second peripheral carry line. The third carry signal CR[N+1] generated in the third stage ST[N+1] may be transmitted to the stage ST[N] through the third carry line CRL3.

A third input terminal IN3 of the stage ST[N] may be supplied with a first high voltage VDD1, and a fourth input terminal IN4 may be supplied with a second high voltage VDD2. The voltage level of the second high voltage VDD2 may be higher than the voltage level of the first high voltage VDD1, but the present disclosure is not particularly limited thereto. For example, the first high voltage VDD1 may be 15 V, and the second high voltage VDD2 may be 25 V.

A fifth input terminal IN5 of the stage ST[N] may receive a first low voltage VSS1, and a sixth input terminal IN6 may receive a second low voltage VSS2. The voltage level of the first low voltage VSS1 may be the same as or different from the voltage level of the second low voltage VSS2.

The stage ST[N] may receive a boost clock signal BCK through a first control terminal CINa and may receive a carry clock signal CR_CK through a second control terminal CINb. The stage ST[N] may receive first to sixth clock signals CK1, CK2, CK3, CK4, CK5, and CK6 through first to sixth clock terminals CIN1, CIN2, CIN3, CIN4, CIN5, and CIN6. In an embodiment of the present disclosure, the first to sixth clock terminals CIN1, CIN2, CIN3, CIN4, CIN5, and CIN6 of each of the first and third stages ST[N−1] and ST[N+1] may receive clock signals having inverted phases with the first to sixth clock signals CK1, CK2, CK3, CK4, CK5, and CK6, respectively.

The carry output terminal COUT of the stage ST[N] may output a carry signal CR[N]. The carry signal CR[N] may be transmitted to the first stage ST[N−1] and the third stage ST[N+1]. The carry signal CR[N] may be referred to as a second carry signal, and hereinafter, referred to as a second carry signal CR[N]. The first stage ST[N−1], the stage ST[N], and the third stage ST[N+1] may be electrically connected to a second carry line CRL2. The second carry signal CR[N] generated in the stage ST[N] may be transmitted to the first stage ST[N−1] and the third stage ST[N+1] through the second carry line CRL2.

The first to sixth output terminals OUT1, OUT2, OUT3, OUT4, OUT5, and OUT6 of the stage ST[N] may output first to sixth scan signals SS1[N], SS2[N], SS3[N], SS4[N], SS5[N], and SS6[N], respectively. The first to sixth scan signals SS1[N], SS2[N], SS3[N], SS4[N], SS5[N], and SS6[N] may be provided to, for example, pixels in six rows in a second pixel group PXG1.

The first to sixth scan signals SS1[N], SS2[N], SS3[N], SS4[N], SS5[N], and SS6[N] may be first scan signals (or referred to as first type scan signals) that are provided through first type scan lines SCLs (see FIG. 5), respectively. In an embodiment, the first to sixth scan signals SS1[N], SS2[N], SS3[N], SS4[N], SS5[N], and SS6[N] may be second scan signals (or referred to as second type scan signals) that are provided through second type scan lines SSLs (see FIG. 5), respectively.

Referring to FIG. 6B, one stage ST[N] may include a first node Q-C, a second node QB, a third node N-CQ, a fourth node N-B, and a plurality of division nodes Q-1 to Q-6. The first node Q-C may be referred to as a Q node, a plurality of division nodes Q-1 to Q-6 may be referred to as division Q nodes, and the second node QB may be referred to as a QB node.

Furthermore, one stage ST[N] may further include a first circuit S101, a second circuit S102, a third circuit S103, a fourth circuit S104, a fifth circuit S105, a sixth circuit S106, a seventh circuit S107, an eighth circuit S108, and a ninth circuit S109.

The first circuit S101 may control a voltage of the first node Q-C, and may be referred to as a first node control circuit. The first circuit S101 may include first to fourth transistors T11, T12, T13, and T14.

A first transistor T11 and a second transistor T12 may be connected in series to each other, and the first and second transistors T11 and T12 may have a dual gate structure. The first transistor T11 and the second transistor T12 may be connected between a first input terminal IN1 and a first node Q-C. Furthermore, both the gate electrode of the first transistor T11 and the gate electrode of the second transistor T12 may be connected to a first input terminal IN1. A fourth input terminal IN4 may be connected between the first transistor T11 and the second transistor T12. The first and second transistors T11 and T12 are turned on in response to a gate-on-voltage (e.g., a logic high level) of the first carry signal CR[N−1], and the second transistor T12 may transmit the second high voltage VDD2 to the first node Q-C. An operation of transmitting the second high voltage VDD2 to the first node Q-C may be referred to as a pre-charging operation or a primary boosting operation. A third transistor T13 and a fourth transistor T14 may be connected in series to each other, and the third and fourth transistors T13 and T14 may have a dual gate structure. The third and fourth transistors T13 and T14 may be connected between the first node Q-C and the sixth input terminal IN6. Furthermore, a gate electrode of the third transistor T13 and a gate electrode of the fourth transistor T14 may be connected to a second input terminal IN2. The third and fourth transistors T13 and T14 may transfer the second low voltage VSS2 to the first node Q-C in response to a gate-on-voltage (e.g., a logic high level) of the third carry signal CR[N+1].

The second circuit S102 may include a first transistor T21 and a second transistor T22. The first transistor T21 and the second transistor T22 may be connected in series to each other, and the first and second transistors T21 and T22 may be connected between the first node Q-C and the sixth input terminal IN6. Furthermore, a gate electrode of the first transistor T21 and a gate electrode of the second transistor T22 may be connected to the second node QB. The first and second transistors T21 and T22 may transmit a second low voltage VSS2 to the first node Q-C in response to a voltage of the second node QB. Accordingly, the second circuit S102 may be referred to as a first node stabilization circuit.

The third circuit S103 may include a first transistor T31, a second transistor T32, a third transistor T33, a fourth transistor T34, and a fifth transistor T35.

The first transistor T31 may be connected between the second node QB and the third input terminal IN3. The second transistor T32 and the third transistor T33 may be connected in series to each other, the gate electrodes of the second and third transistors T32 and T33 may be connected to the third input terminal IN3, and the second and third transistors T32 and T33 may be connected between the third input terminal IN3 and the gate electrode of the first transistor T31.

The fourth transistor T34 may be connected between the gate electrode of the first transistor T31 and the fifth input terminal IN5, and the fifth transistor T35 may be connected between the second node QB and the sixth input terminal IN6. The gate electrode of the fourth transistor T34 and the gate electrode of the fifth transistor T35 may be connected to the first node Q-C.

The second and third transistors T32 and T33 transmit the first high voltage VDD1 to the gate electrode of the first transistor T31 in response to the first high voltage VDD1. The operation of the fourth transistor T34 is controlled in response to the voltage of the first node Q-C. When the fourth transistor T34 is turned on, the first low voltage VSS1 may be transmitted to the gate electrode of the first transistor T31.

The first transistor T31 may transmit the first high voltage VDD1 to the second node QB in response to the voltage of the gate electrode of the first transistor T31. The operation of the fifth transistor T35 is controlled in response to the voltage of the first node Q-C. When the fifth transistor T35 is turned on, the second low voltage VSS2 may be transmitted to the second node QB.

The fourth circuit S104 may include a first transistor T41, a second transistor T42, and a capacitor C4.

The first transistor T41 may be connected between the first control terminal CINA and the fourth node N-B. The gate electrode of the first transistor T41 may be connected to the first node Q-C. The operation of the first transistor T41 is controlled in response to the voltage of the first node Q-C. When the first transistor T41 is turned on, a logic high level voltage may be provided to the fourth node N-B.

The second transistor T42 may be connected between the fourth node N-B and a sixth input terminal IN6. A gate electrode of the second transistor T42 may be connected to the second node QB. The operation of the second transistor T42 is controlled in response to the voltage of the second node QB. When the second transistor T42 is turned on, a second low voltage VSS2 may be provided to the fourth node N-B.

The capacitor C4 is connected to the gate electrode of the first transistor T41 and the fourth node N-B. The capacitor C4 may increase (boost-up) the voltage of the first node Q-C in response to the voltage increase of the fourth node N-B, which may be referred to as a secondary boosting operation.

The fifth circuit S105 may include a first transistor T51 and a second transistor T52.

The first transistor T51 may be connected between the second control terminal CINb and the carry output terminal COUT. The gate electrode of the first transistor T51 may be connected to a first node Q-C. The operation of the first transistor T51 is controlled in response to the voltage of the first node Q-C. When the first transistor T51 is turned on, the logic high level voltage of the second carry signal CR[N] may be provided to the carry output terminal COUT.

The second transistor T52 may be connected between the carry output terminal COUT and the sixth input terminal IN6. The gate electrode of the second transistor T52 may be connected to a second node QB. The operation of the second transistor T52 is controlled in response to the voltage of the second node QB. When the second transistor T52 is turned on, a second low voltage VSS2 may be provided to the carry output terminal COUT.

The sixth circuit S106 may control a voltage of the third node N-CQ, and may be referred to as a third node control circuit. The sixth circuit S106 may include a first transistor T61, a second transistor T62, and a third transistor T63.

The first transistor T61 and the second transistor T62 may be connected in series to each other, and the first and second transistors T61 and T62 may have a dual gate structure. The first transistor T61 and the second transistor T62 may be connected between the fourth input terminal IN4 and a third node N-CQ. Furthermore, a gate electrode of the first transistor T61 and a gate electrode of the second transistor T62 may be connected to a first input terminal IN1. The first and second transistors T61 and T62 may transmit a second high voltage VDD2 to the third node N-CQ in response to a gate-on-voltage (e.g., a logic high level) of the first carry signal CR[N−1].

The third transistor T63 may be connected between the third node N-CQ and a third input terminal IN3. Furthermore, a gate electrode of the third transistor T63 may be connected to the second input terminal IN2. The third transistor T63 may transmit the first high voltage VDD1 to the third node N-CQ in response to a gate-on-voltage (e.g., a logic high level) of the third carry signal CR[N+1].

The seventh circuit S107 may include a transistor T71. The transistor T71 may be connected between the third input terminal IN3 and the third node N-CQ. A gate electrode of the transistor T71 may be connected to a fourth node N-B. The transistor T71 may provide the first high voltage VDD1 to the third node N-CQ in response to a voltage of the fourth node N-B.

The eighth circuit S108 may include a first transistor T81 and a second transistor T82.

The first transistor T81 and the second transistor T82 may be connected in series to each other, and the first and second transistors T81 and T82 may be connected between the third node N-CQ and the fifth input terminal IN5. Furthermore, both the gate electrode of the first transistor T81 and the gate electrode of the second transistor T82 may be connected to the second node QB. The first and second transistors T81 and T82 may transmit the first low voltage VSS1 to the third node N-CQ in response to the voltage of the second node QB. Accordingly, the eighth circuit S108 may be referred to as a third node stabilization circuit.

The ninth circuit S109 may include a plurality of output circuits S109*s*. In an embodiment of the present disclosure, because one stage ST[N] outputs six scan signals, the ninth circuit S109 may include six output circuits S109*s*. In FIG. 6B, a total of two output circuits, a first output circuit and a last output circuit (e.g., a sixth output circuit), are illustrated by way of example.

Each of the output circuits S109*s* may include a first transistor T91, a second transistor T92, a third transistor T93, and a capacitor C9. Hereinafter, the first output circuit S109*s* is described, and the remaining output circuits S109*s* also include substantially the same configuration, and thus repeated descriptions thereof are omitted.

The first transistor T91 may be connected between a first clock terminal CIN1 and a first output terminal OUT1. The gate electrode of the first transistor T91 may be connected to a division node Q-1. The second transistor T92 may be connected between the first node Q-C and the division node Q-1. The gate electrode of the second transistor T92 may be connected to the third node N-CQ. The second transistor T92 may connect the first node Q-C and the division node Q-1 in response to the voltage of the third node N-CQ, or may separate the first node Q-C and the division node Q-1.

The operation of the first transistor T91 is controlled in response to the voltage of the division node Q-1. When the first transistor T91 is turned on, a logic high level voltage of a scan signal SS1[N] may be output to the first output terminal OUT1.

According to an embodiment of the present disclosure, the transistor T71 may be turned on at a timing, at which the fourth node N-B is boosted, to transmit the first high voltage VDD1 to the third node N-CQ. The voltage of the first node Q-C may be higher than the first high voltage VDD1 of the third node N-CQ at a timing, at which the fourth node N-B is boosted. Accordingly, the second transistor T92 may be turned off. The second transistor T92 may separate the first node Q-C and the division node Q-1 in response to the voltage of the third node N-CQ.

While signals are output to the first to sixth output terminals OUT1, OUT2 (not shown), OUT3 (not shown), OUT4 (not shown), OUT5 (not shown), and OUT6, the first node Q-C and the division node Q-1 may be electrically separated from each other, and the division nodes Q-1 to Q-6 may also be electrically separated from each other. Accordingly, even when the voltage of the division node Q-1 is coupled and changed according to the signal output to the first output terminal OUT1, the influence on other nodes may be eliminated. For example, the other nodes may be the other division nodes except for the division node Q-1 of the first node Q-C and the division nodes Q-1 to Q-6. Accordingly, a horizontal line defect due to a luminance difference for the lines may be eliminated.

According to an embodiment of the present disclosure, when the second low voltage VSS2 is transmitted to the first node Q-C in response to the gate-on-voltage of the third carry signal CR[N+1], the voltage of the first node Q-C may be lower than the voltage of the third node N-CQ. In this case, the second transistor T92 is turned on to be connected to the first node Q-C, and the division node Q-1 may be discharged.

The third transistor T93 may be connected between the first output terminal OUT1 and the fifth input terminal IN5. The gate electrode of the third transistor T93 may be connected to the second node QB. The operation of the third transistor T93 is controlled in response to the voltage of the second node QB. When the third transistor T93 is turned on, the first low voltage VSS1 may be provided to the first output terminal OUT1.

Figure 7:
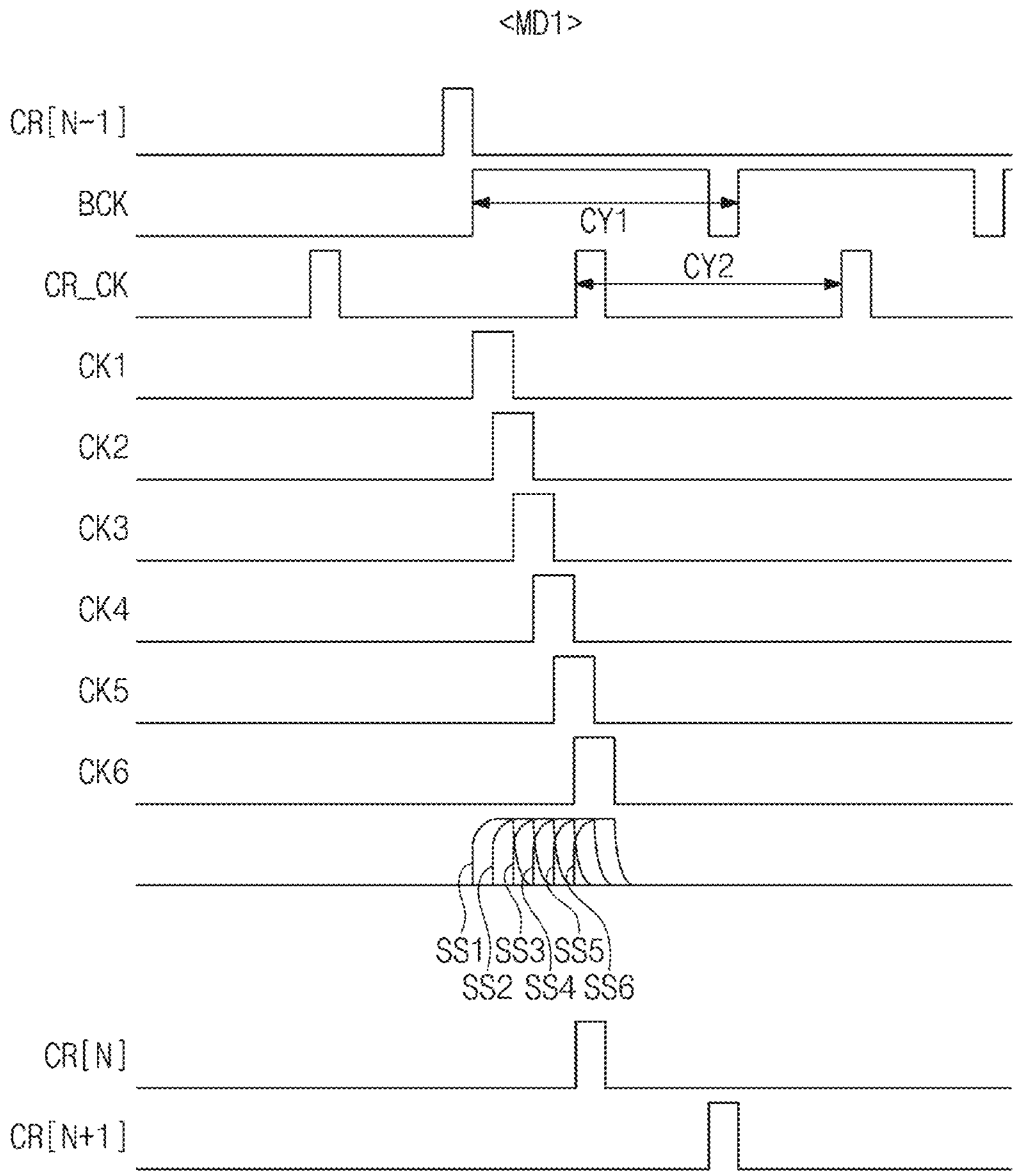
FIG. 7 is a timing diagram illustrating an operation of a stage in a first mode according to an embodiment of the present disclosure.
Figure 8:
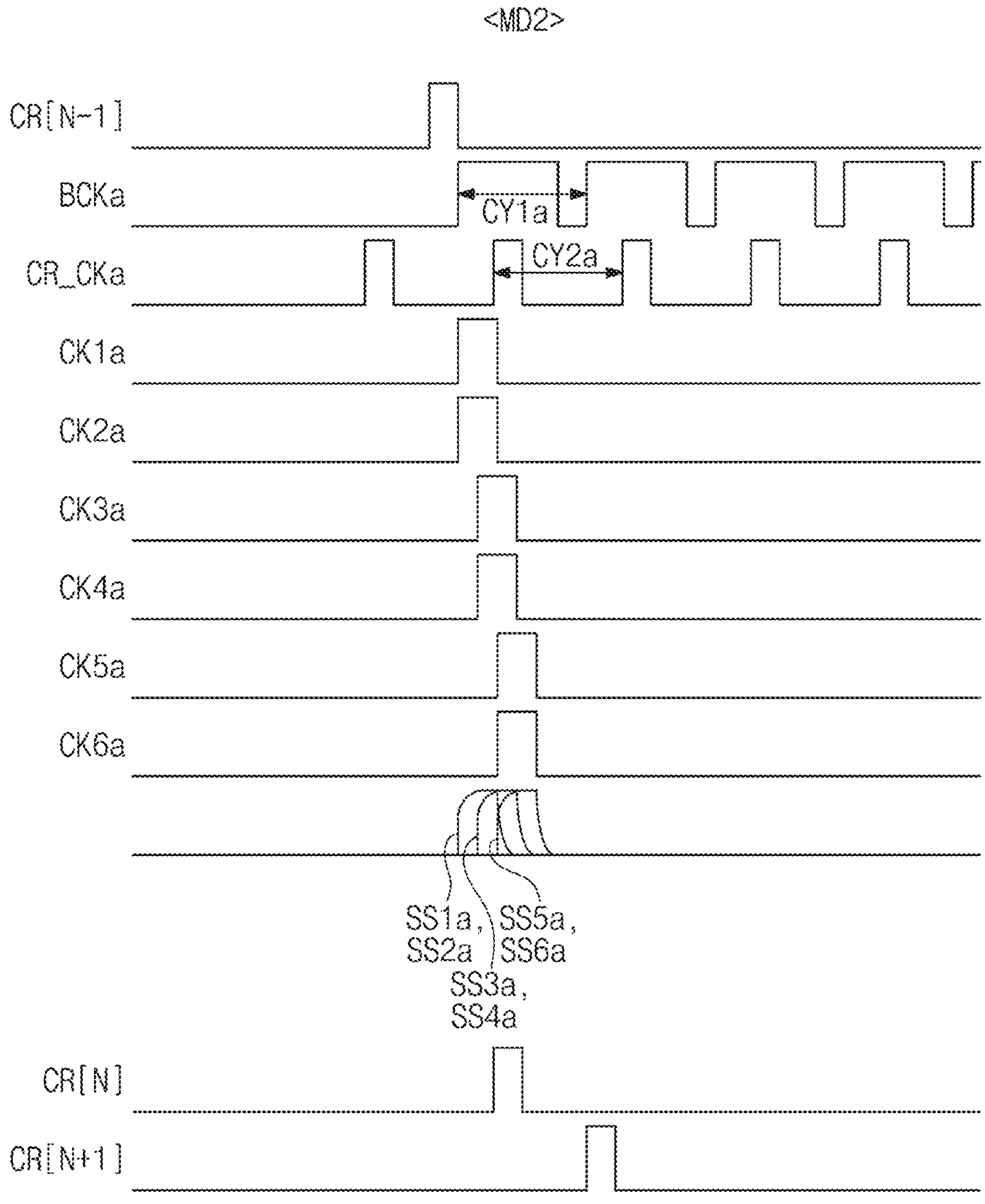
FIG. 8 is a timing diagram of a plurality of clock signals for describing an operation of a stage in a second mode according to an embodiment of the present disclosure.

The capacitor C9 is connected to the division node Q-1 and the fourth node N-B. The capacitor C9 may increase (boost-up) the voltage of the division node Q-1 in response to the voltage increase of the fourth node N-B. When the voltage of the division node Q-1 increases, the scan signal SS1 [N] having a high voltage may be output without distortion. FIG. 7 is a timing diagram for describing an operation of the stage in a first mode MD1 according to an embodiment of the present disclosure. FIG. 8 is a timing diagram of a plurality of clock signals for describing an operation of the stage in a second mode MD2 according to an embodiment of the present disclosure.

Referring to FIGS. 1A, 7, and 8, the display panel DP may selectively operate in a first mode MD1 or a second mode MD2. For example, the first mode MD1 may be a normal driving mode that is driven with a first frequency, and the second mode MD2 may be a high frequency driving mode that is driven with a second frequency that is higher than the first frequency. For example, the first frequency may be 240 Hz, and the second frequency may be 480 Hz. However, the first frequency and the second frequency described above are only examples, and the first and second frequencies are not particularly limited to the above examples.

Referring to FIG. 7, the first carry signal CR[N−1], the second carry signal CR[N], the third carry signal CR[N+1], the boost clock signal BCK, the carry clock signal CR_CK, and the first to sixth clock signals CK1, CK2, CK3, CK4, CK5, and CK6 in the first mode MD1 are illustrated by way of example.

Referring to FIG. 8, in the second mode MD2, the first carry signal CR[N−1], the second carry signal CR[N], the third carry signal CR[N+1], the boost clock signal BCKa, the carry clock signal CR_CKa, and first to sixth clock signals CK1*a*, CK2*a*, CK3*a*, CK4*a*, CK5*a*, and CK6*a* are illustrated by way of example.

Referring to FIGS. 7 and 8, a cycle CY1 of the boost clock signal BCK in the first mode MD1 may be longer than a cycle CY1*a* of the boost clock signal BCK in the second mode MD2. For example, the cycle CY1 may be twice the cycle CY1*a*. Furthermore, a cycle CY2 of the carry clock signal CR_CK in the first mode MD1 may be longer than a cycle CY2*a* of the carry clock signal CR_CK in the second mode MD2. For example, the cycle CY2 may be twice the cycle CY2*a*. That is, in the second mode MD2, a cycle of clocks may be decreased.

According to an embodiment of the present disclosure, at least some of a plurality of scan lines may be driven (e.g., activated) at the same time for low power driving or high speed driving. For example, two scan lines may be driven at the same time, and the second mode MD2 may be referred to as a dual line gate driving mode. In an embodiment of the present disclosure, the first mode MD1 may be a high resolution mode, and the second mode MD2 may be a high scan rate mode.

In the first mode MD1, the first to sixth clock signals CK1, CK2, CK3, CK4, CK5, and CK6 may have different phases. That is, the first to sixth clock signals CK1, CK2, CK3, CK4, CK5, and CK6 may have waveforms that are shifted by a specific interval. Correspondingly, the first to sixth scan signals SS1, SS2, SS3, SS4, SS5, and SS6 that are output in synchronization with the first to sixth clock signals CK1, CK2, CK3, CK4, CK5, and CK6 may have different phases. The first to sixth scan signals SS1, SS2, SS3, SS4, SS5, and SS6 may also be referred to as first mode scan signals.

The first to sixth scan signals SS1, SS2, SS3, SS4, SS5, and SS6 may be first scan signals (or referred to as first type scan signals) that are provided through first type scan lines SCLs (see FIG. 5), respectively. In an implementation, the first to sixth scan signals SS1, SS2, SS3, SS4, SS5, and SS6 may be second scan signals (or referred to as second type scan signals) that are provided through second type scan lines SSLs (see FIG. 5), respectively.

In the second mode MD2, some of the first to sixth clock signals CK1*a*, CK2*a*, CK3*a*, CK4*a*, CK5*a*, and CK6*a* may have the same phase. For example, the waveforms of a first clock signal CK1*a* and a second clock signal CK2*a* may be the same. A third clock signal CK3*a* may have a waveform that is shifted for a specific time with respect to the first clock signal CK1*a*, and the waveforms of the third clock signal CK3*a* and a fourth clock signal CK4*a* may be the same. Furthermore, the waveforms of a fifth clock signal CK5*a* and a sixth clock signal CK6*a* may be the same.

In the second mode MD2, some of the first to sixth scan signals SS1*a*, SS2*a*, SS3*a*, SS4*a*, SS5*a*, and SS6*a* that are output in synchronization with the first to sixth clock signals CK1*a*, CK2*a*, CK3*a*, CK4*a*, CK5*a*, and CK6*a* may have the same waveform. For example, the first scan signal SS1*a* and the second scan signal SS2*a* may overlap each other and may have substantially the same waveform. In this case, in the second mode MD2, a data voltage DS (see FIG. 6B) may be simultaneously provided to pixels in one row that receive the first scan signal SS1*a* and pixels in one row that receive the second scan signal SS2*a*.

The third scan signal SS3*a* and the fourth scan signal SS4*a* may overlap each other and have substantially the same waveform. The fifth scan signal SS5*a* and the sixth scan signal SS6*a* may overlap each other and have substantially the same waveform. The first to sixth scan signals SS1*a*, SS2*a*, SS3*a*, SS4*a*, SS5*a*, and SS6*a* may also be referred to as second mode scan signals.

The first to sixth scan signals SS1*a*, SS2*a*, SS3*a*, SS4*a*, SS5*a*, and SS6*a* may be first scan signals (or referred to as first type scan signals) that are provided through first type scan lines SCLs (see FIG. 5), respectively. In an embodiment, the first to sixth scan signals SS1*a*, SS2*a*, SS3*a*, SS4*a*, SS5*a*, and SS6*a* may be second scan signals (or referred to as second type scan signals) that are provided through second type scan lines SSLs (see FIG. 5), respectively.

Figure 9:
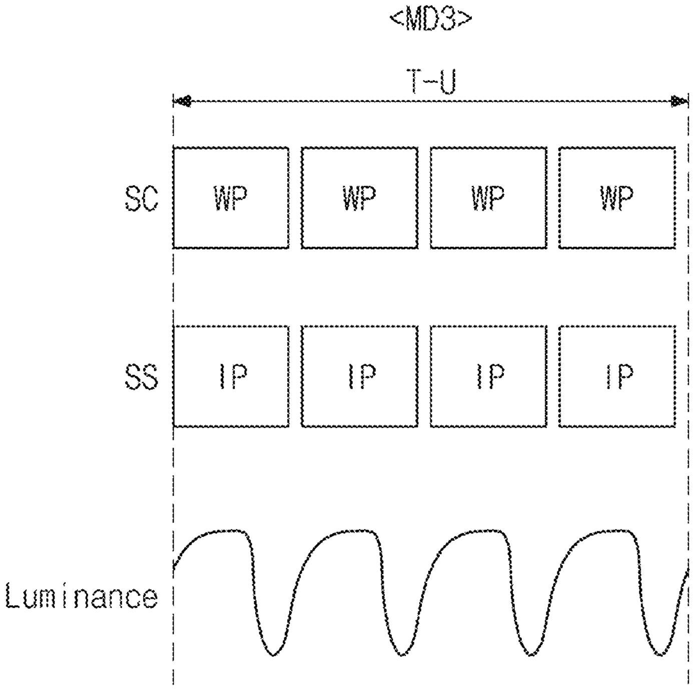
FIG. 9 is a view illustrating activation states and changes in luminance of a first type scan signal and a second type scan signal according to an embodiment of the present disclosure.
Figure 10:
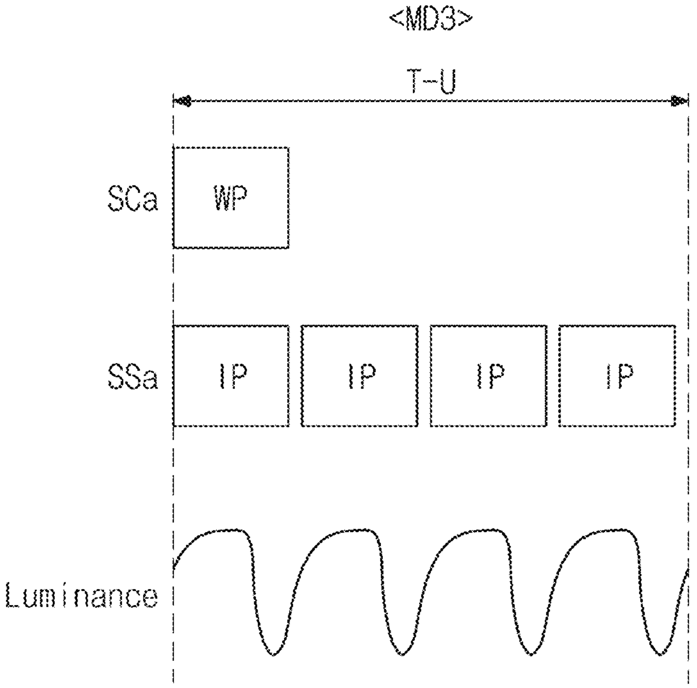
FIG. 10 is a view illustrating activation states and changes in luminance of a first type scan signal and a second type scan signal according to an embodiment of the present disclosure.

FIG. 9 is a view illustrating activation states and changes in luminance of a first type scan signal SC and a second type scan signal SS according to an embodiment of the present disclosure. FIG. 10 is a view illustrating activation states and changes in luminance of a first type scan signal SCa and a second type scan signal SSa according to an embodiment of the present disclosure. The first type scan signal SC and the first type scan signal SCa may be signals that are provided to the i-th first type scan line SCLi illustrated in FIG. 4, and the second type scan signal SS and the second type scan signal SSa may be signals that are provided to the i-th second type scan line SSLi illustrated in FIG. 4.

Referring to FIGS. 1A, 9, and 10, the display panel DP may operate in a mode driven with a variable frame frequency (hereinafter, a third mode MD3). For example, the variable frame frequency may be variously modified within a range of 1 Hz to 240 Hz, but is not particularly limited thereto. FIG. 9 illustrates the luminance of the first type scan signal SC, the second type scan signal SS, and the display panel DP when driven at 240 Hz by way of example, and FIG. 10 illustrates the luminance of the first type scan signal SCa, the second type scan signal SSa, and the display panel DP when driven at 60 Hz by way of example.

Referring to FIGS. 9 and 10, when the display panel DP is driven at 240 Hz, the first type scan signal SC may include four write cycle sections WP, and the second type scan signal SS may include four initialization cycle sections IP during a unit time T-U. Furthermore, when the display panel DP is driven at 60 Hz, the first type scan signal SCa may include one write cycle section WPa, and the second type scan signal SSa may include four initialization cycle sections IP.

In the write cycle section WP or WPa, the first type scan signal SC or SCa may have a waveform, which repeatedly transitions between logic high level and the logic low level, and in the remaining section except for the write cycle section WP or WPa, the first type scan signal SC or SCa may have a logic low level. Furthermore, in the initialization cycle sections IP, the second type scan signal SS or SSa may have a waveform, which repeatedly transitions between logic high level and the logic low level.

Referring to FIG. 5 together, a plurality of first type stages SC-ST1, SC-ST2, and SC-ST3 of the first type scan driver SCD, which generate the first type scan signal SC or SCa, and a plurality of second type stages SS-ST1, SS-ST2, and SS-ST3 of the second type scan driver SSD, which generate the second type scan signal SS or SSa, may be separated from each other. Accordingly, an operation of the first type scan signal SC or SCa and an operation of the second type scan signal SS or SSa may be separated from each other. As a result, the number of initialization cycle sections IP within the unit time T-U may be adjusted regardless of the operating frequency of the display panel DP. In this case, a difference in optical waveforms according to the operating frequency of the display panel DP may be reduced, and as a result, a difference in luminance according to the operating frequency of the display panel DP may be reduced. That is, an image display quality of the display panel DP may be improved.

The driving modes described in FIGS. 7, 8, 9, and 10 may be applied to the display panel DP in various combinations. For example, in an embodiment of the present disclosure, the display panel DP may operate in any one of the first mode MD1, the second mode MD2, and the third mode MD3. The first mode MD1 may correspond to a mode driven at 240 Hz in the third mode MD3. In an embodiment of the present disclosure, the display panel DP may operate in any one of the first mode MD1 and the third mode MD3. In this case, the first mode MD1 may be a general driving mode that is driven at a fixed frequency, and the third mode MD3 may be a variable driving mode that is driven at a variable frequency. In other embodiments of the present disclosure, the display panel DP may operate in any one of the first mode MD1 and the second mode MD2. In an embodiment of the present disclosure, the display panel DP may operate only in the first mode MD1. In other embodiments of the present disclosure, the display panel DP may operate only in the third mode MD3.

Figure 11:
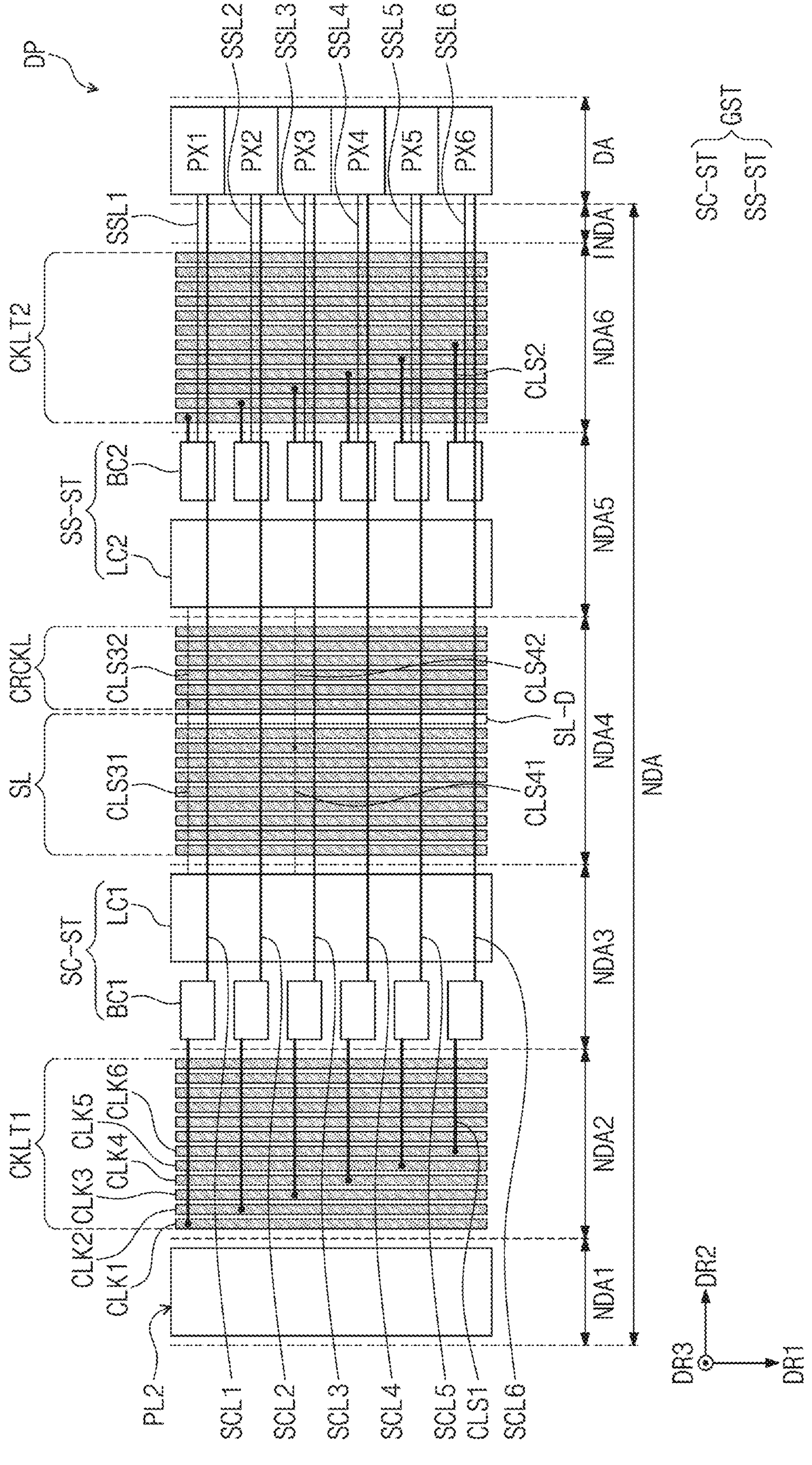
FIG. 11 is a plan view of a part of a display panel according to an embodiment of the present disclosure.

FIG. 11 is a plan view of a portion of the display panel DP according to an embodiment of the present disclosure.

Referring to FIG. 11, the display panel DP may include a plurality of pixels PX1, PX2, PX3, PX4, PX5, and PX6, one group stage GST, a plurality of first type scan lines SCL1 to SCL6, a plurality of second type scan lines SSL1 to SSL6, a plurality of first type clock lines CKLT1, a plurality of second type clock lines CKLT2, a plurality of connection lines CLS1, CLS2, CLS31, CLS32, CLS41, and CLS42, a plurality of carry clock lines CRCKL, a plurality of signal lines SL, and a second power line PL2.

A plurality of pixels PX1, PX2, PX3, PX4, PX5, and PX6 may be disposed on the display area DA. The pixels PX1, PX2, PX3, PX4, PX5, and PX6 may be arranged along the first direction DR1. That is, the pixels PX1, PX2, PX3, PX4, PX5, and PX6 may be arranged in different rows. The pixels PX1, PX2, PX3, PX4, PX5, and PX6 may include a first pixel PX1, a second pixel PX2, a third pixel PX3, a fourth pixel PX4, a fifth pixel PX5, and a sixth pixel PX6 that are sequentially arranged along the first direction DR1.

The first to sixth pixels PX1, PX2, PX3, PX4, PX5, and PX6 may receive scan signals that are provided from one group stage GST. For example, one group stage GST may include a first type stage SC-ST and a second type stage SS-ST, and the first type stage SC-ST may provide first type scan signals to first type scan lines SCL1 to SCL6, and the second type stage SS-ST may provide second type scan signals to second type scan lines SSL1 to SSL6.

The non-display area NDA may be divided into a plurality of areas. For example, the non-display area NDA may include a first non-display area NDA1, a second non-display area NDA2, a third non-display area NDA3, a fourth non-display area NDA4, a fifth non-display area NDA5, a sixth non-display area NDA6, and an introduction area INDA. The first to sixth non-display areas NDA1, NDA2, NDA3, NDA4, NDA5, and NDA6, and the introduction area INDA may be sequentially defined along the second direction DR2 in a direction that faces the display area DA. That is, the first non-display area NDA1 may be closest to an edge of the display panel DP, and the introduction area INDA may be closest to the display area DA.

The second power line PL2 may be disposed in the first non-display area NDA1. A second power voltage ELVSS (see FIG. 4) may be applied to the second power line PL2. The second power line PL2 may be electrically connected to the pixel PXij (see FIG. 4).

The first type clock lines CKLT1 may be disposed in the second non-display area NDA2. Some of the first type clock lines CKLT1 may be lines that transmit the first to sixth clock signals CK1, CK2, CK3, CK4, CK5, and CK6 (see FIG. 6A) provided to the first type stage SC-ST.

The first type clock lines CKLT1 may include a first clock line CKL1, a second clock line CKL2, a third clock line CKL3, a fourth clock line CKL4, a fifth clock line CKL5, and a sixth clock line CKL6. Each of the first to sixth clock lines CKL1, CKL2, CKL3, CKL4, CKL5, and CKL6 extends along the first direction DR1, and the first to sixth clock lines CKL1, CKL2, CKL3, CKL4, CKL5, and CKL6 may be arranged along the second direction DR2. Six clock lines that are arranged on the right side of the sixth clock line CKL6, among the first type clock lines CKL1, may be lines that transmit clock signals to the first type stage of the next group stage GST illustrated in FIG. 11.

The first type stage SC-ST may be disposed in the third non-display area NDA3. That is, as the first type stage SC-ST is disposed directly adjacent to the first type clock lines CKLT1, a line design length in the circuit may be reduced or minimized. The first type stage SC-ST may include a plurality of first buffer circuits BC1 and a first logic circuit LC1. The first buffer circuits BC1 may correspond to six output circuits S109*s* illustrated in FIG. 6B, respectively. The first logic circuit LC1 may correspond to the remaining portions of the one stage ST[N] illustrated in FIG. 6B, except for the six output circuits S109*s*. However, this is only an example, and each of the first buffer circuits BC1 may only include a first transistor T91, and some of the components represented by the output circuit S109*s* may be omitted, or other components may be further included in addition to the components represented by the output circuit S109*s*.

According to an embodiment of the present disclosure, the first buffer circuits BC1 may be disposed between the first logic circuit LC1 and the first type clock lines CKLT1. Because the first buffer circuits BC1 receive the first to sixth clock signals CK1, CK2, CK3, CK4, CK5, and CK6 (see FIG. 6A) from the first type clock lines CKLT1, the first type clock lines CKLT1 may be disposed to be closest to the first buffer circuits BC1. Accordingly, the lengths of the plurality of first clock connection lines CLS1 that connect the first type clock lines CKLT1 to the first buffer circuits BC1 may be minimized.

According to an embodiment of the present disclosure, the first buffer circuits BC1 may be sequentially arranged along the first direction DR1. That is, an arrangement direction of the first buffer circuits BC1 may be the same as an arrangement direction of the first to sixth pixels PX1, PX2, PX3, PX4, PX5, and PX6. In this case, the first buffer circuits BC1 and the first to sixth pixels PX1, PX2, PX3, PX4, PX5, and PX6 may be arranged to face each other in the second direction DR2. Accordingly, the lengths of the first type scan lines SCL1-SCL6 that are connected to the first buffer circuits BC1 in one-to-one correspondence and extend toward sixth pixels PX1, PX2, PX3, PX4, PX5, and PX6 may be minimized.

The carry clock lines CRCKL and the signal lines SL may be disposed in the fourth non-display area NDA4. In an embodiment of the present disclosure, the signal lines SL may be spaced apart from the display area DA with the carry clock lines CRCKL interposed therebetween. That is, the distance between the first type stage SC-ST and the signal lines SL may be smaller than the distance between the first type stage SC-ST and the carry clock lines CRCKL.

The second type stage SS-ST may be disposed in the fifth non-display area NDA5. The second type clock lines CKLT2 may be disposed in the sixth non-display area NDA6. That is, as the second type stage SS-ST is disposed directly adjacent to the second type clock lines CKLT2, a line design length in the circuit may be reduced or minimized. The second type stage SS-ST may include a plurality of second buffer circuits BC2 and a second logic circuit LC2. The second buffer circuits BC2 may correspond to six output circuits S109*s* illustrated in FIG. 6B, respectively. The second logic circuit LC2 may correspond to the remaining portions of the one stage ST[N] illustrated in FIG. 6B except for the six output circuits S109*s*.

According to an embodiment of the present disclosure, the second buffer circuits BC2 may be disposed between the second logic circuit LC2 and the second type clock lines CKLT2. The first type stage SC-ST and the second type stage SS-ST may have structures that are line-symmetrical to each other with respect to an imaginary line that extends along the first direction DR1. The second buffer circuits BC2 may receive first to sixth clock signals CK1, CK2, CK3, CK4, CK5, and CK6 from the second type clock lines CKLT2, and thus, may be disposed closest to the second type clock lines CKLT2. Accordingly, the lengths of a plurality of second clock connection lines CLS2 that connect the second type clock lines CCLT2 to the second buffer circuits BC2 may be minimized.

According to an embodiment of the present disclosure, the second buffer circuits BC2 may be sequentially arranged along the first direction DR1. That is, an arrangement direction of the second buffer circuits BC2 may be the same as an arrangement direction of the first to sixth pixels PX1, PX2, PX3, PX4, PX5, and PX6. In this case, the second buffer circuits BC2 and the first to sixth pixels PX1, PX2, PX3, PX4, PX5, and PX6 may be aligned to face each other in the second direction DR2. Accordingly, the lengths of the second type scan lines SSL1 to SSL6 that are connected to the second buffer circuits BC1 in one-to-one correspondence and extend toward the first to sixth pixels PX1, PX2, PX3, PX4, PX5, and PX6, may be minimized.

According to an embodiment of the present disclosure, the first clock connection lines CLS1 may be routed around the first logic circuit LC1. The second clock connection lines CLS2 and the second type scan lines SSL1 to SSL6 may be routed around the second logic circuit LC2. That is, the space occupied by the first clock connection lines CLS1 is not present in the area, in which the first logic circuit LC1 is disposed, and the space occupied by the second clock connection lines CLS2 and the second type scan lines SSL1 to SSL6 is not present in the area, in which the second logic circuit LC2 is disposed. Accordingly, a space for designing the first logic circuit LC1 and the second logic circuit LC2 may be further secured. Accordingly, a design for narrowing the widths of the first logic circuit LC1 and the second logic circuit LC2 in the second direction DR2 may be easier.

According to an embodiment of the present disclosure, the first type scan lines SCL1 to SCL6 may extend from the first buffer circuits BC1 to be electrically connected to the first to sixth pixels PX1, PX2, PX3, PX4, PX5, and PX6 across the introduction area INDA, respectively. The second type scan lines SSL1 to SSL6 may extend from the second buffer circuits BC2, and may be electrically connected to the first to sixth pixels PX1, PX2, PX3, PX4, PX5 and PX6, respectively, across the introduction area INDA. The introduction area INDA is an area that is adjacent to the first to sixth pixels PX1, PX2, PX3, PX3, PX4, PX5, and PX6, and may be defined between the sixth non-display area NDA6 and the display area DA.

According to an embodiment of the present disclosure, the first type scan lines SCL1-SCL6 may extend from the first buffer circuits BC1 to a position connected to the first to sixth pixels PX1, PX2, PX3, PX4, PX5, and PX6 respectively, and the second type scan lines SSL1-SSL6 may extend from the second buffer circuits BC2 to a position connected to the first to sixth pixels PX1, PX2, PX3, PX4, PX5, and PX6 respectively. For example, the first, first type of scan line SCL1 may extend from the first buffer circuits BC1 to a position connected to the first pixel PX1, the second first type of scan line SCL 2 may extend from the first buffer circuits BC1 to a position connected to the second pixel PX2 and so on. Similarly, for example, the first, second type of scan line SSL1 may extend from the second buffer circuits BC2 to a position connected to the first pixel PX1, the second, second type of scan line SSL 2 may extend from the first buffer circuits BC1 to a position connected to the second pixel PX2 and so on. Accordingly, a fan-out section for aligning the first type scan lines SCL1-SCL6 and the second type scan lines SSL1-SSL6 according to the arrangement of the first to sixth pixels PX1, PX2, PX3, PX4, PX5, and PX6 may be omitted. For example, the fan-out section may mean a section, in which lines that extend along the first direction DR1, are disposed. Accordingly, the width of the non-display area NDA may be further reduced.

According to an embodiment of the present disclosure, the carry clock lines CRCKL and the signal lines SL may be disposed between a first type stage SC-ST and a second type stage SS-ST. At least some of the carry clock lines CRCKL and the signal lines SL may be electrically connected to both the first type stage SC-ST and the second type stage SS-ST. FIG. 11 illustrates a first connection line CLS41 and a second connection line CLS42 that are connected to one of the signal lines SL, and a first carry connection line CLS31 and a second carrier connection line CLS32 that are connected to one of the carry clock lines CRCKL.

The first connection line CLS41 may be electrically connected to one signal line SL and the first type stage SC-ST, and may extend along the second direction DR2. The second connection line CLS42 may be electrically connected to one signal line SL and the second type stage SS-ST and may extend along a second direction DR2. The first connection line CLS41 and the second connection line CLS42 may be spaced apart from each other in the second direction DR2.

The first carry connection line CLS31 may be electrically connected to one carry clock line CRCKL and the first type stage SC-ST, and may extend along the second direction DR2. The second carry connection line CLS32 may be electrically connected to one carry clock line CRCKL and the second type stage SS-ST, and may extend along the second direction DR2. The first carry connection line CLS31 and the second carry connection line CLS32 may be spaced apart from each other in the second direction DR2.

According to an embodiment of the present disclosure, as the carry clock lines CRCKL and the signal lines SL are disposed between the first type stage SC-ST and the second type stage SS-ST, some of the connection lines may be arranged to face each other in the second direction DR2. Accordingly, the number of the connection lines arranged in the first direction DR1 may be reduced. Accordingly, a degree of freedom of design, by which the width of the line that extends in the first direction DR1, in the second direction DR2, may be reduced, may be generated. A detailed description thereof will be described later with reference to FIGS. 12A and 12B.

Furthermore, according to an embodiment of the present disclosure, the first type clock lines CKLT1, the second type clock lines CKLT2, the carry clock lines CRCKL, and the signal lines SL are not disposed continuously with each other. That is, the first type stage SC-ST may be disposed between some of the first type clock lines CKLT1, the second type clock lines CKLT2, the carry clock lines CRCKL, and the signal lines SL, and the second type stage SS-ST may be disposed between some of the others and some of the others. This may reduce the number of cross signal lines that extend in the second direction DR2 that crosses one signal line that extends in the first direction DR1. Accordingly, a degree of freedom of design, by which the width of the line that extends in the first direction DR1, in the second direction DR2, may be reduced, may be generated, and a detailed description thereof will be described later with reference to FIGS. 12A and 12B.

Figure 12A:
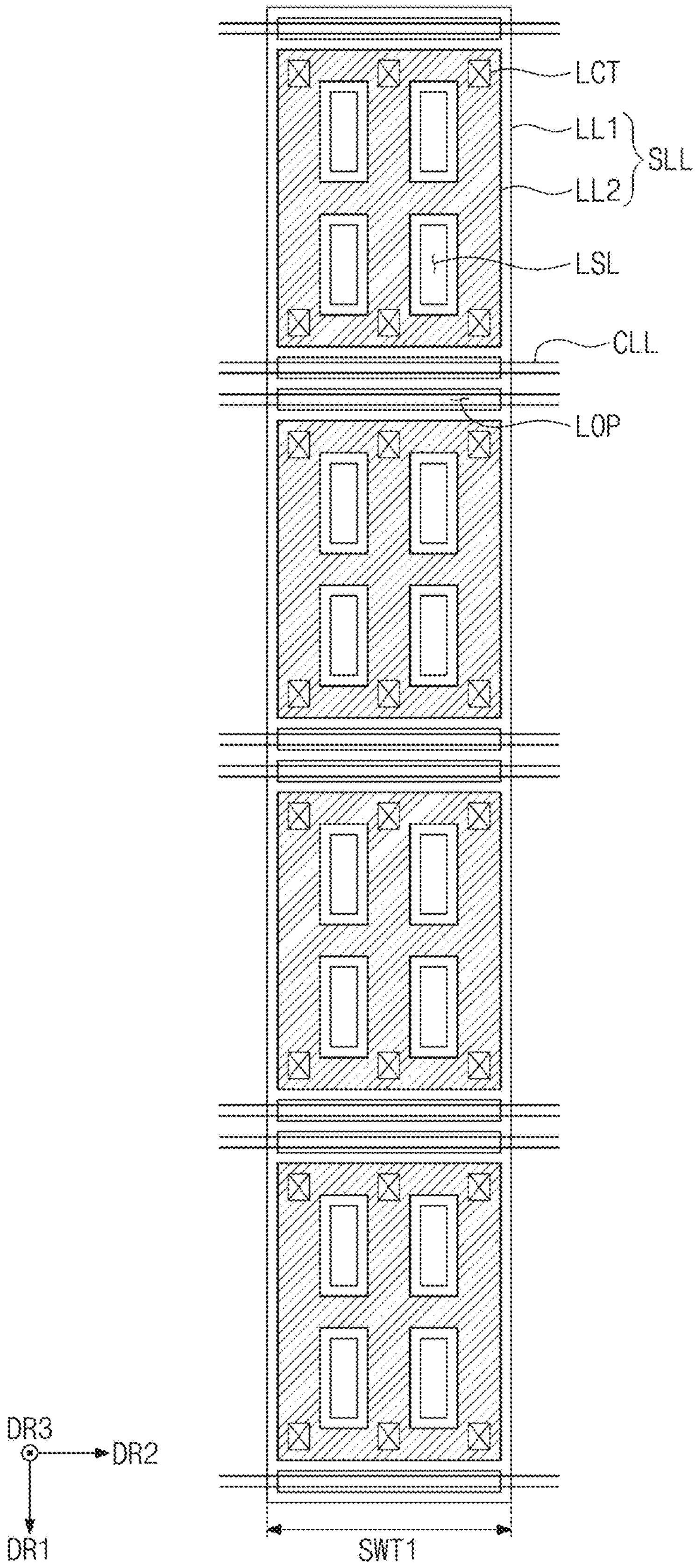
FIG. 12A is a plan view illustrating one signal line and a plurality of cross signal lines according to a comparative example of the present disclosure.
Figure 12B:
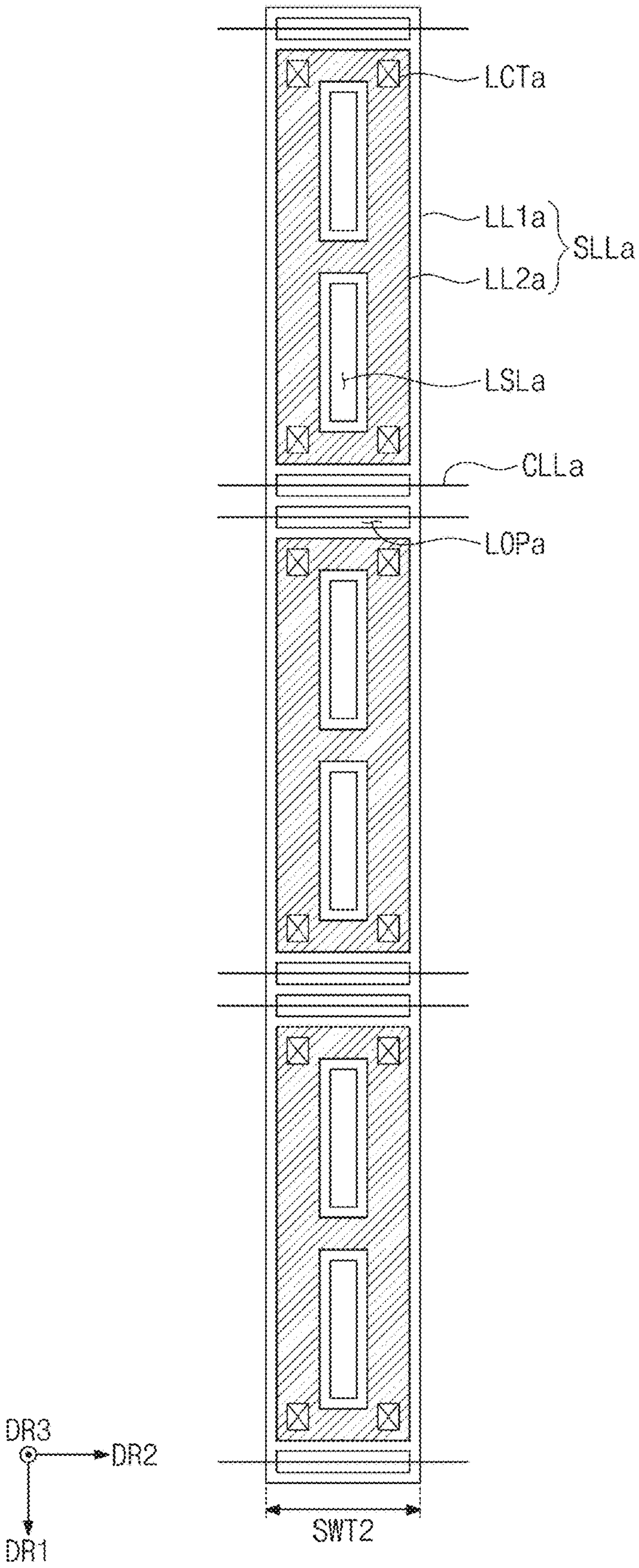
FIG. 12B is a plan view illustrating one signal line and a plurality of cross signal lines according to an embodiment of the present disclosure.

FIG. 12A is a plan view illustrating one signal line and a plurality of cross signal lines according to a comparative example of the present disclosure. FIG. 12B is a plan view illustrating one signal line and a plurality of cross signal lines according to an embodiment of the present disclosure.

Referring to FIG. 12A, one signal line SLL and sixteen cross signal lines CLL are illustrated. The signal lines SLL may extend along the first direction DR1, the cross signal lines CLL may overlap the signal line SLL, and may extend along the second direction DR2.

One signal line SLL may include a first layer line LL1, and a plurality of second layer patterns LL2 that are electrically connected to the first layer line LL1. The second layer patterns LL2 may be electrically connected to the first layer line LL1 through a contact LCT. The second layer patterns LL2 may be disposed on the same layer as the cross signal lines CLL, and may be electrically insulated from the second layer patterns LL2 and the cross signal lines CLL.

A plurality of openings LOP and a plurality of slits LSL may be defined in one signal line SLL. The openings LOP may be provided to prevent coupling between the signal line SLL and the cross signal lines CLL. For example, the openings LOP may overlap the cross signal lines CLL. A section, to which the openings LOP are applied, may act as a bottleneck section and cause an increase in resistance of one signal line SLL. Accordingly, as the number of the openings LOP increases, the width of the one signal line SLL in the second direction DR2 may increase to decrease the resistance.

The slits LSL may be provided in an area that does not overlap the cross signal lines CLL. It is illustrated in FIG. 12A as an example that two slits LSL are arranged in a second direction DR2. The slits LSL may be provided to transmit light in a process of curing a sealing member that is used in a process of manufacturing the display panel DP (see FIG. 1A). Accordingly, the slits LSL may be omitted from the signal lines SLL included in the display panel DP having a structure that does not require a sealing member. Furthermore, when the position of one signal line SLL is in an area that does not overlap the sealing member, the slits LSL may be omitted.

Referring to FIG. 12B, one signal line SLLa and six cross signal lines CLLa are illustrated. The signal line SLLa may extend along the first direction DR1, the cross signal lines CLLa may overlap the signal line SLLa, and may extend along the second direction DR2. One signal line SLLa may be any one of the first type clock lines CKLT1, the second type clock lines CKLT2, the carry clock lines CRCKL, and the signal lines SL described above with reference to FIG. 11. The cross signal lines CLLa may be at least some of the first type scan lines SCL1 to SCL6, the second type scan lines SSL1-SSL6, and the connection lines CLS1, CLS2, CLS31, CLS32, CLS41, and CLS42 described above with reference to FIG. 11.

One signal line SLLa may include a first layer line LL1*a*, and a plurality of second layer patterns LL2*a* that are electrically connected to the first layer line LL1*a*. The second layer patterns LL2*a* may be electrically connected to the first layer line LL1*a* through a contact LCTa. The second layer patterns LL2*a* may be disposed on the same layer as the cross signal lines CLLa, and may be electrically insulated from the second layer patterns LL2*a* and the cross signal lines CLLa.

When the number of the cross signal lines CLLa that overlap a signal line SLLa is decreased, the number of openings LOPa that are provided to prevent coupling may be decreased. That is, as the number of bottleneck sections is decreased, the width of one signal line SLLa may be further decreased. For example, with the assumption of the same target resistance of the signal lines SLLa, the width SWT2 of the signal line SLLa of FIG. 12B in the second direction DR2, which overlaps a relatively smaller number of cross signal lines CLLa, may be smaller than the width SWT1 of the signal line SLL of FIG. 12A in the second direction DR2.

Figure 12C:
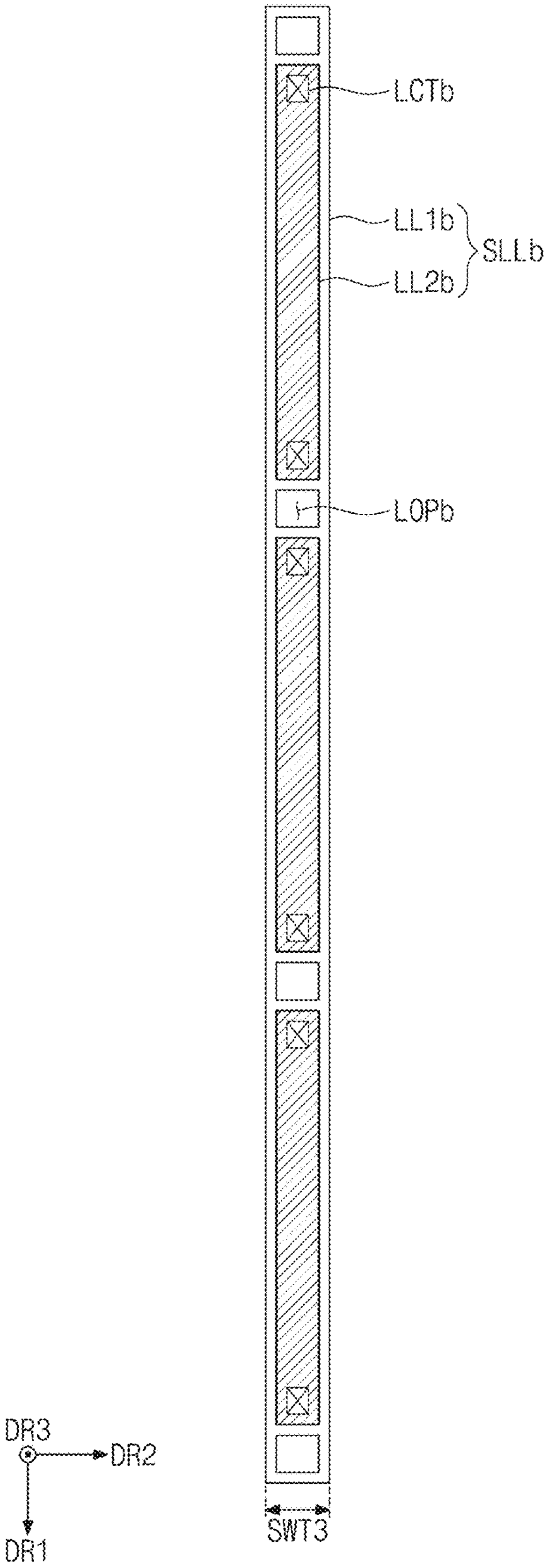
FIG. 12C is a plan view illustrating a signal line according to an embodiment of the present disclosure.

FIG. 12C is a plan view illustrating a signal line SLLb according to an embodiment of the present disclosure.

Referring to FIG. 12C, one signal line SLLb may include a first layer line LL1*b*, and a plurality of second layer patterns LL2*b* that are electrically connected to the first layer line LL1*b*. The second layer patterns LL2*b* may be electrically connected to the first layer line LL1*b* through a contact LCTb.

The signal line SLLb illustrated in FIG. 12C may be a signal line SLLb that is disposed closer to a display area DA (see FIG. 11) than one signal line SLLa illustrated in FIG. 12B. For example, when the signal line SLLa illustrated in FIG. 12B is one of first type clock lines CKLT1 (see FIG. 11), the signal line SLLb illustrated in FIG. 12C may be one of carry clock lines CRCKL (see FIG. 11).

That is, because the signal line SLLb illustrated in FIG. 12C is disposed to be spaced apart from the edge of the display panel DP, the slits LSLa (see FIG. 12B) may be omitted. That is, the slits may be omitted from the signal line SLLb. Accordingly, the resistance of the signal line SLLb may be further reduced, and the width SWT3 in the second direction DR2 of the signal line SLLb may be designed to be narrower.

Figure 13:
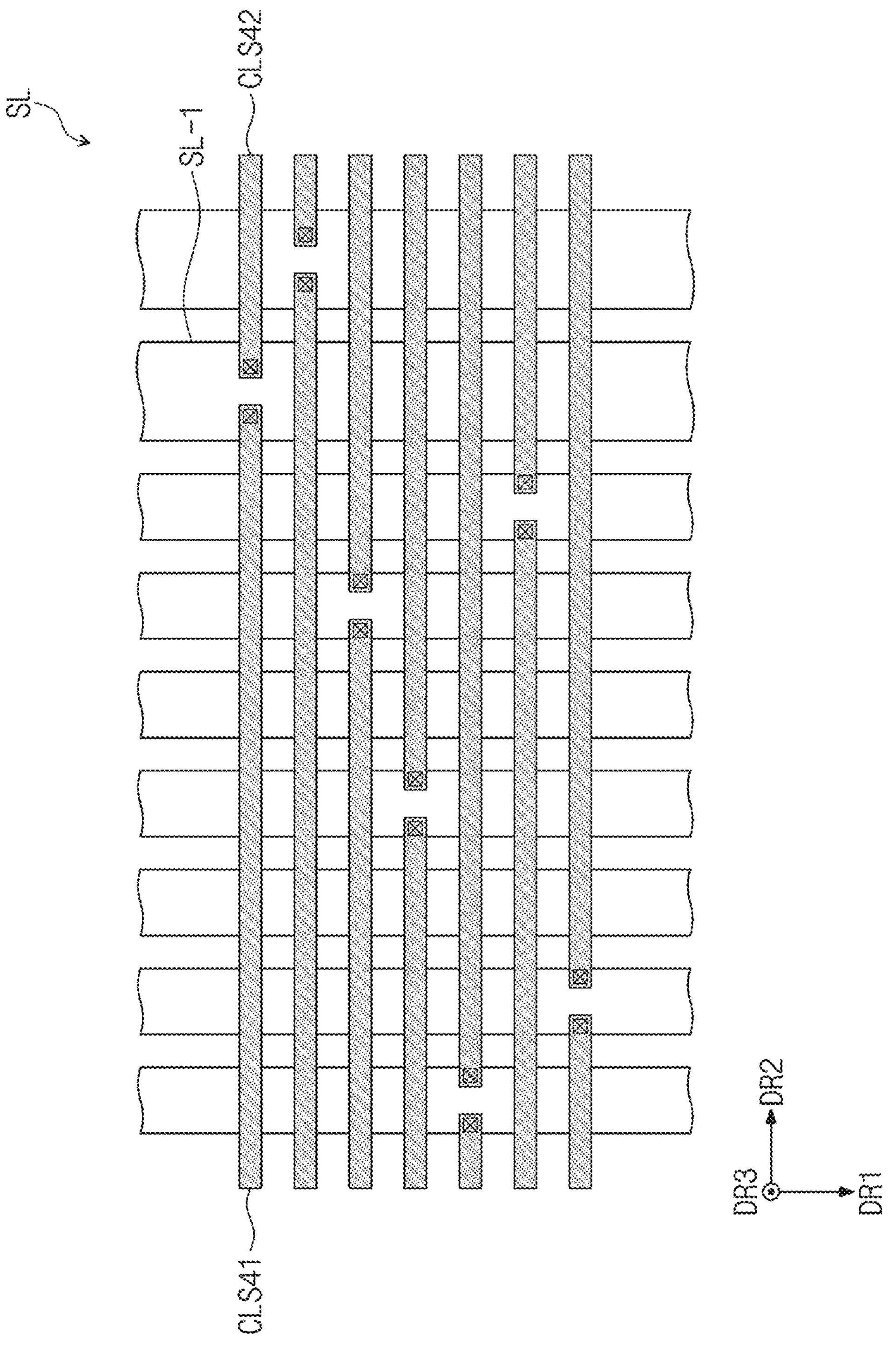
FIG. 13 is a plan view illustrating some of signal lines according to an embodiment of the present disclosure.

FIG. 13 is a plan view illustrating some of signal lines SL according to an embodiment of the present disclosure.

Referring to FIG. 13, the signal lines SL are disposed between the first type stage SC-ST and the second type stage SS-ST. Accordingly, among the signal lines SL, a signal line SL-1 that is electrically connected to both the first type stage SC-ST and the second type stage SS-ST may be connected to two connection lines CLS41 and CLS42.

The two connection lines CLS41 and CLS42 face each other in the second direction DR2, and may extend in opposite directions. Accordingly, the number of the connection lines arranged in the first direction DR1 may be reduced. Accordingly, a degree of freedom of design, by which the width of the line that extends in the first direction DR1, in the second direction DR2, may be reduced, may be generated. Furthermore, an area, in which connection lines are not disposed, may be secured as an area, in which other patterns or other lines are to be disposed. That is, as the designable area is secured, the degree of freedom of design may be further improved.

Figure 14:
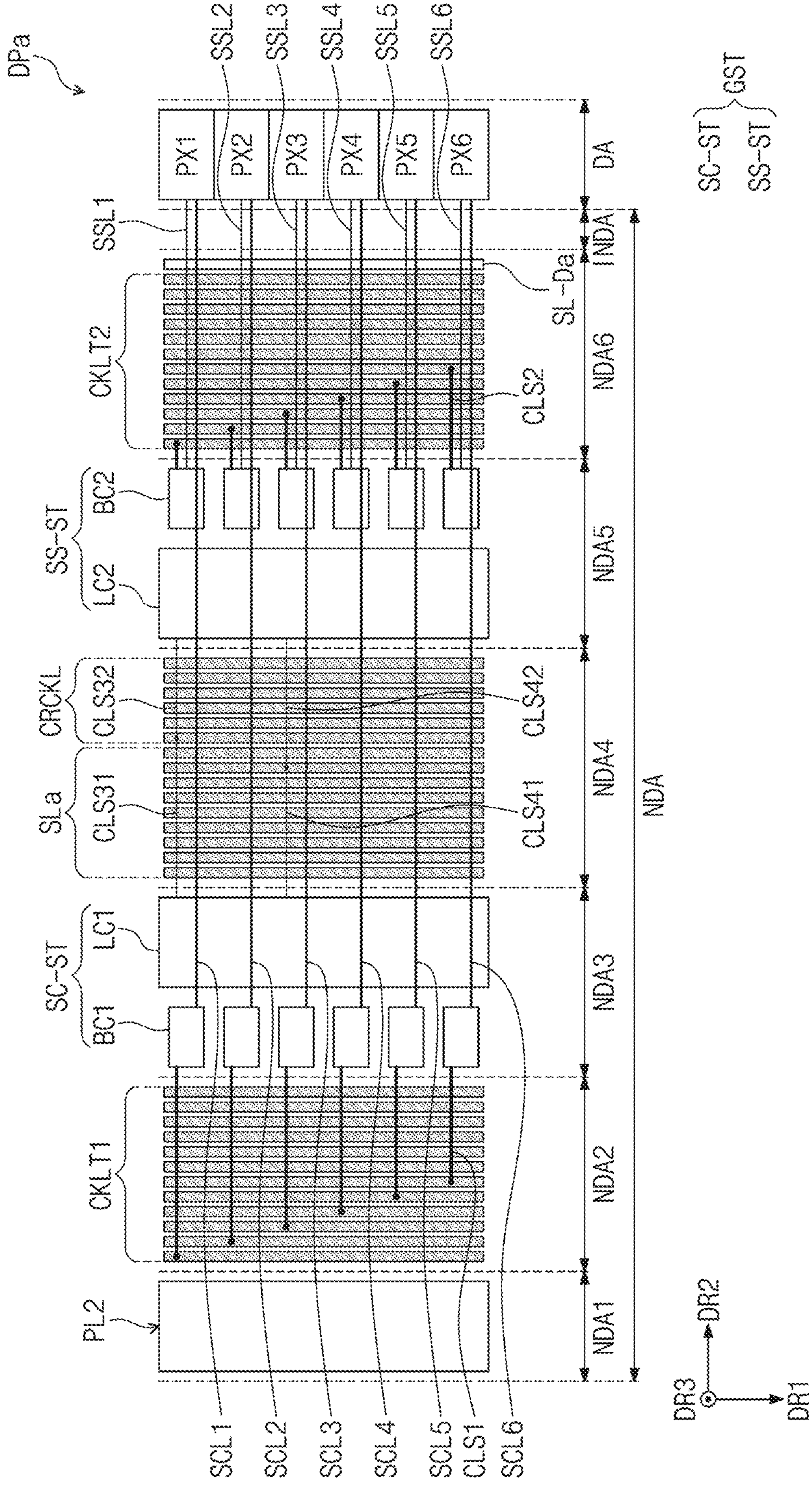
FIG. 14 is a plan view of a portion of a display panel according to an embodiment of the present disclosure.

FIG. 14 is a plan view of a portion of the display panel DPa according to an embodiment of the present disclosure. In the description of FIG. 14, the same reference numerals are assigned to the same components described with reference to FIG. 11, and thus the descriptions thereof are omitted to avoid redundancy.

In FIG. 11 above, a voltage line SL-D may be disposed in the fourth non-display area NDA4 together with the signal lines SLa. That is, in FIG. 11, the voltage line SL-Da may be disposed between the first type stage SC-ST and the second type stage SS-ST. Referring to FIG. 14, at least some the signal lines SL-Da, among the signal lines SLa, may be disposed in the sixth non-display area NDA6. FIG. 14 illustrates an example, in which one signal line SL-Da is disposed in the sixth non-display area NDA6. Hereinafter, one signal line SL-Da is referred to as a voltage line SL-Da.

The voltage line SL-Da may extend along the first direction DR1, and may be disposed between the second type clock lines CKLT2 and the first to sixth pixels PX1, PX2, PX3, PX4, PX5, and PX6. The voltage line SL-Da may be a specific voltage, for example, the specific voltage may be a constant voltage (or DC voltage). Accordingly, the voltage line SL-Da may function as a shielding line.

Coupling between the second type clock lines CKLT2 and the circuit element may occur due to a cap between the second type clock lines CKLT2 and the circuit element disposed in the display area DA. According to an embodiment of the present disclosure, the voltage line SL-Da may receive the second low voltage VSS2 illustrated in FIG. 6B. That is, the voltage line SL-Da may be disposed between the second type clock lines CKLT2 and the display area DA to serve as a shielding layer. That is, the voltage line SL-Da may prevent coupling between the second type clock lines CKLT2 and the circuit element.

Although FIG. 14 illustrates as an example that one voltage line SL-Da is disposed between the second type clock lines CKLT2 and the display area DA, the present disclosure is not particularly limited thereto. For example, at least some of the voltage lines, to which a specific voltage is provided, among the signal lines SLa may be additionally disposed between the second type clock lines CKLT2 and the display area DA.

Figure 15:
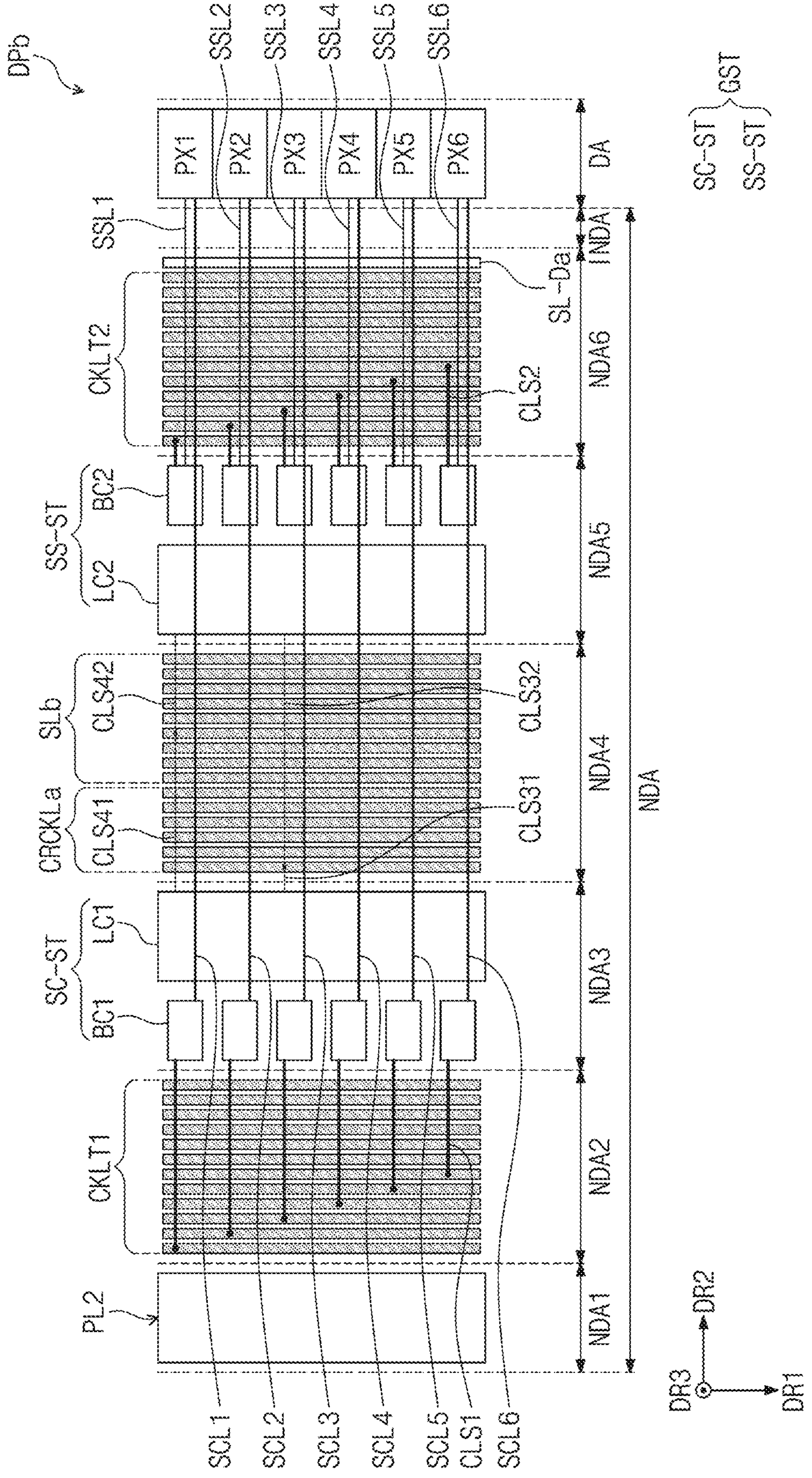
FIG. 15 is a plan view of a portion of a display panel according to an embodiment of the present disclosure.

FIG. 15 is a plan view of a portion of the display panel DPb according to an embodiment of the present disclosure. In the description of FIG. 15, the same reference numerals are assigned to the same components described with reference to FIG. 14, and thus the descriptions thereof are omitted to avoid redundancy.

Referring to FIG. 15, the positions of the signal lines SLb and the carry clock lines CRCKLa disposed in the fourth non-display area NDA4 may be different from the positions of the signal lines SLa and the carry clock lines CRCKL of FIG. 14. For example, the carry clock lines CRCKLa may be disposed between the first type stage SC-ST and the signal lines SLb, and the signal lines SLb may be disposed between the carry clock lines CRCKLa and the second type stage SS-ST.

In an embodiment of the present disclosure, at least some of the carry clock lines CRCKL may be disposed between a portion of the signal lines SLb and another portion of the signal lines SLb. That is, the arrangement order or arrangement form of the signal lines SLb and the carry clock lines CRCKL in the fourth non-display area NDA4 may be changed in various forms.

Figure 16:
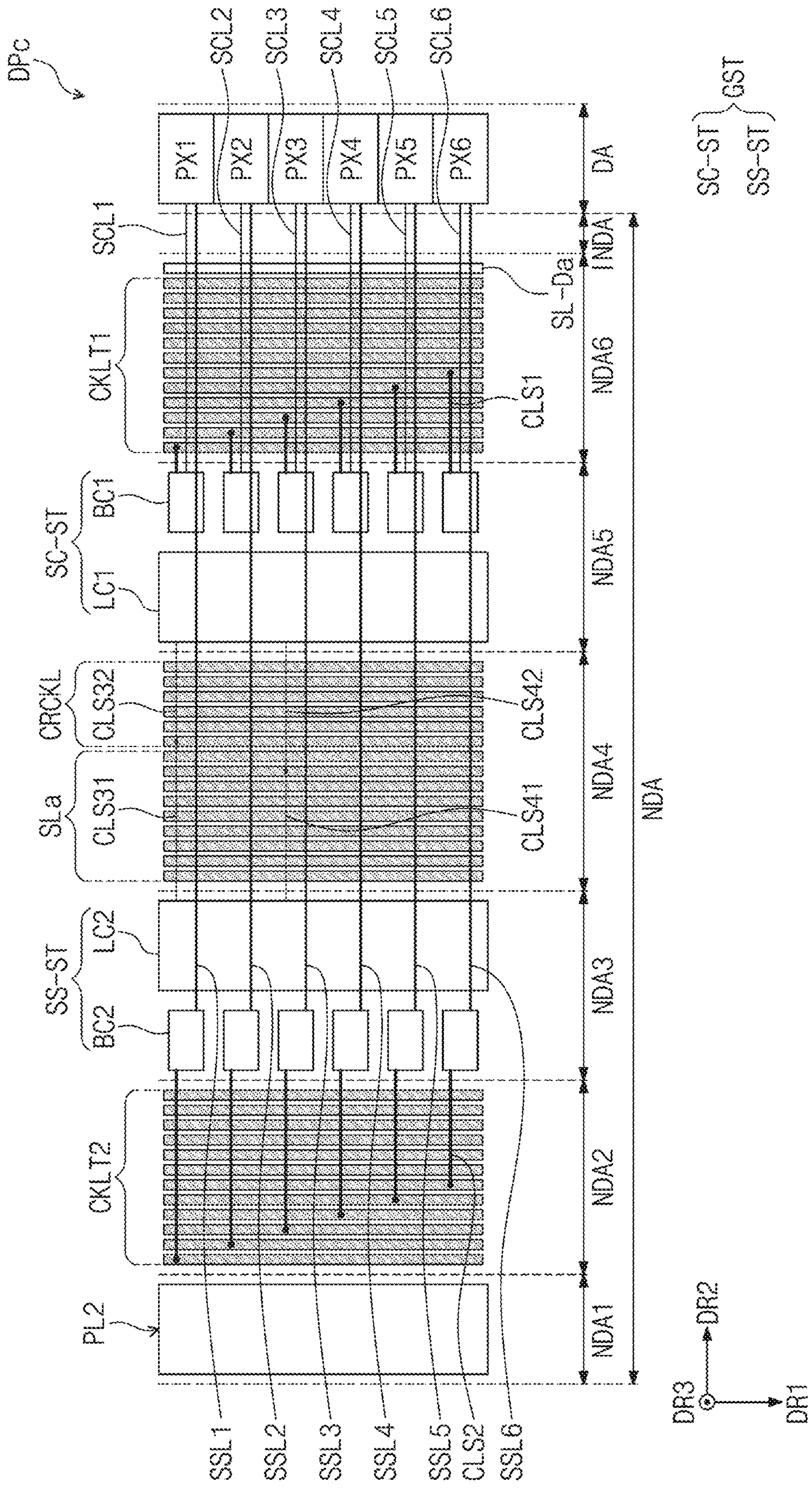
FIG. 16 is a plan view of a portion of a display panel according to an embodiment of the present disclosure.

FIG. 16 is a plan view of a portion of a display panel DPc according to an embodiment of the present disclosure. In the description of FIG. 16, the same reference numerals are assigned to the same components described with reference to FIG. 14, and thus the descriptions thereof are omitted to avoid redundancy.

Referring to FIG. 16, the second type clock lines CKLT2 may be disposed in the second non-display area NDA2, and the second type stage SS-ST may be disposed in the third non-display area NDA3. The carry clock lines CRCKL and the signal lines SL may be disposed in the fourth non-display area NDA4. The first type stage SC-ST may be disposed in the fifth non-display area NDA5. The first type clock lines CKLT1 may be disposed in the sixth non-display area NDA6.

Figure 17:
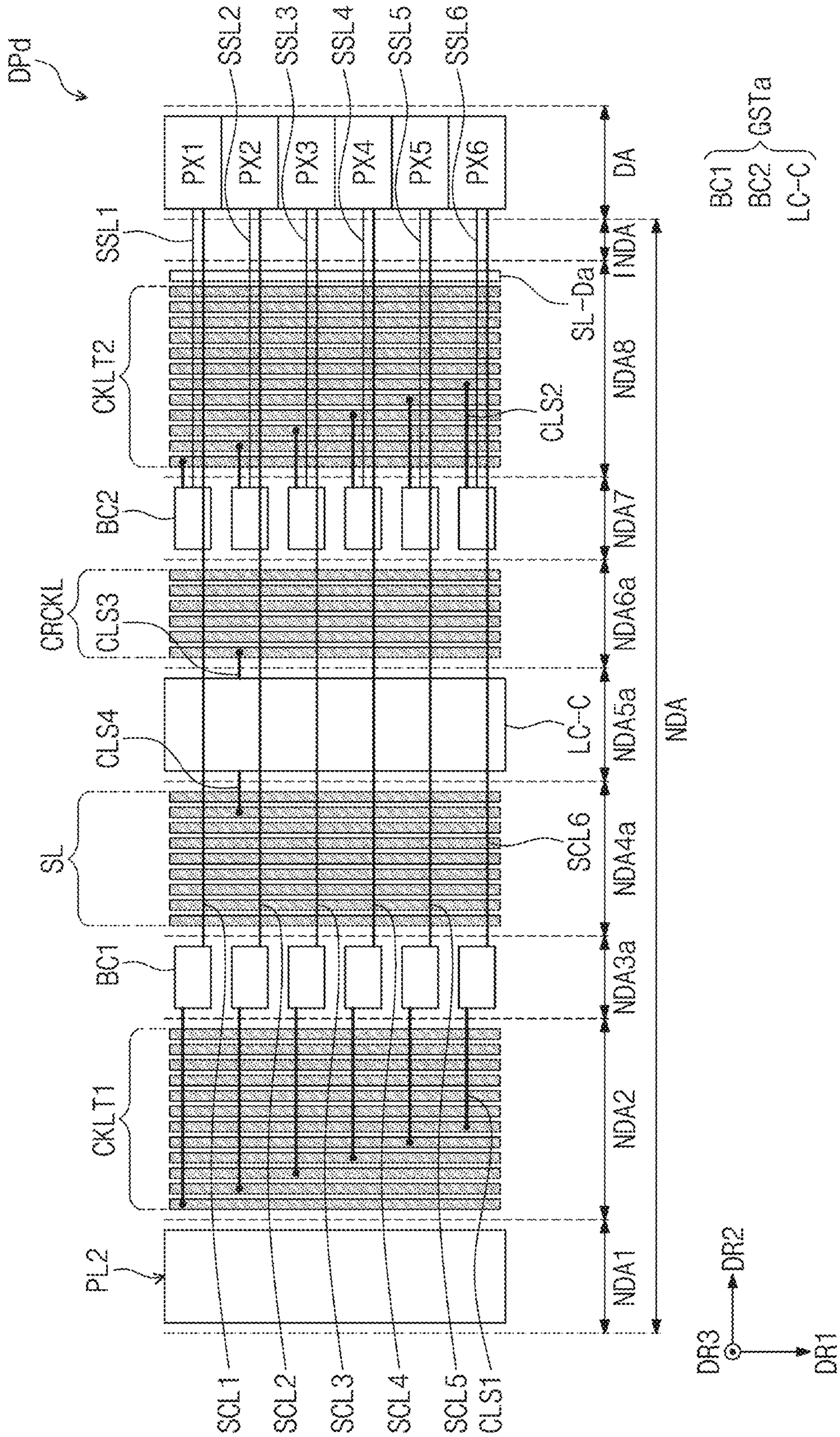
FIG. 17 is a plan view of a portion of a display panel according to an embodiment of the present disclosure.

FIG. 17 is a plan view of a portion of the display panel DPd according to an embodiment of the present disclosure. In the description of FIG. 16, the same reference numerals are assigned to the same components described with reference to FIG. 11, and thus the descriptions thereof are omitted to avoid redundancy.

Referring to FIG. 17, the first to sixth pixels PX1, PX2, PX3, PX4, PX5, and PX6 may receive scan signals that are provided from one group stage GSTa. One group stage GSTa may include an integrated logic circuit LC-C that controls operations of the first buffer circuits BC1 and the second buffer circuits BC2.

In an embodiment of the present disclosure, the integrated logic circuit LC-C may be disposed between the signal lines SL and the carry clock lines CRCKL. The first buffer circuits BC1 may be disposed between the first type clock lines CKLT1 and an integrated logic circuit LC-L, and the second buffer circuits BC2 may be disposed between the integrated logic circuit LC-L and the second type clock lines CKLT2.

The non-display area NDA may be divided into a plurality of areas. For example, the non-display area NDA may include a first non-display area NDA1, a second non-display area NDA2, a third non-display area NDA3*a*, a fourth non-display area NDA4*a*, a fifth non-display area NDA5*a*, a sixth non-display area NDA6*a*, a seventh non-display area NDA7, and an eighth non-display area NDA8. The first to eighth non-display areas NDA1, NDA2, NDA3*a*, NDA4*a*, NDA5*a*, NDA6*a*, NDA7, and NDA8 and the introduction area INDA may be sequentially defined along the second direction DR2 in a direction that faces the display area DA.

In an embodiment of the present disclosure, the common logic circuit LC-L may correspond to the remaining portions of one stage ST[N] except for the six output circuits S109*s*. One stage ST[N] illustrated in FIG. 6B may further include six output circuits having a connection relation that is similar to that of the six output circuits S109*s*. In this case, the first buffer circuits BC1 and the second buffer circuits BC2 may correspond to twelve output circuits, respectively.

The second power line PL2 may be disposed in the first non-display area NDA1, the first type clock lines CKLT1 may be disposed in the second non-display area NDA2, the first buffer circuits BC1 may be disposed in the third non-display area NDA3*a*, the signal lines SL may be disposed in the fourth non-display area NDA4*a*, the integrated logic circuit LC-C may be disposed in the fifth non-display area NDA5*a*, the carry clock lines CRCKL may be disposed in the sixth non-display area NDA6*a*, the second buffer circuits BC2 may be disposed in the seventh non-display area NDA7, the second type clock lines CKLT2 and the voltage line SL-Da may be disposed in the eighth non-display area NDA8.

According to the above-described embodiments, the first buffer circuits BC1, the second buffer circuits BC2, and the pixels PX1, PX2, PX3, PX4, PX5, and PX6 may be respectively arranged in the first direction DR1, and the first buffer circuits BC1, the second buffer circuits BC2, and the pixels PX1, PX2, PX3, PX4, PX5, and PX6 may be aligned in the second direction DR2 crossing the first direction DR1. In this case, a fan-out period for aligning the first type scan lines SCL1 to SCL6 connected to the first buffer circuits BC1 and the second type scan lines SSL1 to SSL6 connected to the second buffer circuits BC2 according to the arrangement order of the pixels PX1, PX2, PX3, PX4, PX5, and PX6 may be omitted or reduced. As a result, the width of the non-display area NDA (see FIG. 3) of the display panel DP (see FIG. 2) may be reduced.

Furthermore, the first type clock lines CKLT1 may be disposed adjacent to the first buffer circuits BC1, and the second type clock lines CKLT2 may be disposed adjacent to the second buffer circuits BC2. Accordingly, the design length of the lines, for example, the first clock connection lines CLS1 and the second clock connection lines CLS2 in the non-display area NDA may be reduced or minimized. Furthermore, as the signal lines SL and the carry clock lines CRCKL are disposed between the first buffer circuits BC1 and the second buffer circuits BC2, the number of cross signal lines CLLa (see FIG. 12B) that cross one signal line SLLa and one signal line SLLa may be reduced. In this case, as the number of bottleneck sections provided to prevent coupling of the cross signal lines CLLa that overlap one signal line SLLa is reduced, the width of one signal line SLLa may be further reduced. As a result, the width of the non-display area NDA (see FIG. 3) of the display panel DP (see FIG. 2) may be reduced.

According to the above description, the display panel includes the plurality of stages disposed in the non-display area, and each of the stages may include first buffer circuits for outputting the first type scan signals to the plurality of pixels and second buffer circuits for outputting the second type scan signals to the plurality of pixels. Each of the first buffer circuits, the second buffer circuits, and the pixels may be arranged in a first direction, and the first buffer circuits, the second buffer circuits, and the plurality of pixels may be aligned in the second direction that crosses the first direction. In this case, a fan-out section for aligning the first type scan lines connected to the first buffer circuits and the second type scan lines connected to the second buffer circuits according to an arrangement order of the pixels may be omitted or reduced.

In addition, the first type clock lines may be disposed adjacent to the first buffer circuits, and the second type clock lines may be disposed adjacent to the second buffer circuits. Accordingly, the line design length in the non-display area may be reduced or minimized. In addition, the number of the cross signal lines that cross one signal line and one signal line may be reduced. When the number of the cross signal lines that overlap one signal line is reduced, the width of one signal line may be further reduced as the number of bottleneck sections provided to prevent coupling of cross signal lines that overlap one signal line may be reduced. As a result, the width of the non-display area may be reduced.

Although an embodiment of the present disclosure has been described for illustrative purposes, those skilled in the art will appreciate that various modifications and substitutions are possible, without departing from the scope and spirit of the present disclosure as disclosed in the accompanying claims. Accordingly, the technical scope of the present disclosure should not be limited to the contents described in the detailed description of the specification but should be defined by the claims.

What is claimed is:

1. A display panel comprising:

a plurality of pixels arranged along a first direction;

a first type stage including a plurality of first buffer circuits configured to output a plurality of first type scan signals to the plurality of pixels, respectively;

a second type stage including a plurality of second buffer circuits configured to output a plurality of second type scan signals to the plurality of pixels, respectively; and a plurality of carry clock lines disposed between the first buffer circuits and the second buffer circuits, and extending in the first direction, wherein the plurality of first buffer circuits are arranged along the first direction, and wherein the plurality of second buffer circuits are arranged along the first direction.

2. The display panel of claim 1, further comprising:

a plurality of first type clock lines electrically connected to the first type stage; and a plurality of second type clock lines electrically connected to the second type stage, wherein the plurality of first type clock lines and the plurality of second type clock lines are spaced apart from each other in a second direction crossing the first direction, and the plurality of carry clock lines are disposed between the first type clock lines and the second type clock lines.

3. The display panel of claim 2, wherein the first type stage is disposed between the plurality of first type clock lines and the plurality of carry clock lines, and wherein the second type stage is disposed between the plurality of second type clock lines and the plurality of carry clock lines.

4. The display panel of claim 2, wherein the first type stage further includes a first logic circuit configured to control operations of the plurality of first buffer circuits, wherein the second type stage further includes a second logic circuit configured to control operations of the plurality of second buffer circuits, wherein the plurality of first buffer circuits are disposed between the plurality of first type clock lines and the first logic circuit, and wherein the plurality of second buffer circuits are disposed between the plurality of second type clock lines and the second logic circuit.

5. The display panel of claim 2, wherein the plurality of first type clock lines, the first type stage, the plurality of carry clock lines, the second type stage, the plurality of second type clock lines, and the plurality of pixels are arranged in the second direction.

6. The display panel of claim 5, further comprising:

a voltage line disposed between the plurality of second type clock lines and the plurality of pixels, wherein the voltage line extends along the first direction.

7. The display panel of claim 5, further comprising:

a voltage line disposed between the first type stage and the second type stage, wherein the voltage line extends along the first direction.

8. The display panel of claim 1, further comprising:
a plurality of signal lines electrically connected to the first type stage and the second type stage,
wherein the plurality of signal lines are disposed between the plurality of first buffer circuits and the plurality of second buffer circuits.

9. The display panel of claim 8, further comprising:
a first connection line extending in a second direction crossing the first direction; and
a second connection line spaced apart from the first connection line along the second direction, and extending along the second direction,
wherein the first connection line is electrically connected to a first signal line in the plurality of signal lines and the first type stage, and the second connection line is electrically connected to the first signal line in the plurality of signal lines and the second type stage.

10. The display panel of claim 8, further comprising: an integrated logic circuit disposed between the plurality of signal lines and the plurality of carry clock lines, and configured to control operations of the plurality of first buffer circuits and the plurality of second buffer circuits.

11. The display panel of claim 1, further comprising:
a plurality of first type scan lines electrically connected to the plurality of first buffer circuits in one-to-one correspondence; and
a plurality of second type scan lines electrically connected to the plurality of second buffer circuits in one-to-one correspondence,
wherein the plurality of first type scan lines and the plurality of second type scan lines are electrically connected to the plurality of pixels across an introduction area adjacent to the plurality of pixels.

12. The display panel of claim 11, wherein at least one of the plurality of second type scan lines is disposed in the introduction area between, a first, first type scan line of the plurality of first type scan lines and a second, first type scan line of the plurality of first type scan lines.

13. The display panel of claim 11, further comprising:
a data line electrically connected to the plurality of pixels; and
a power line electrically connected to the plurality of pixels,
wherein each of the plurality of pixels includes a pixel driving circuit, and a light emitting element electrically connected to the pixel driving circuit, and
wherein the pixel driving circuit includes a first transistor connected between the power line and the light emitting element, a second transistor connected to the data line and a gate electrode of the first transistor, and a third transistor connected between the light emitting element and a read-out line.

14. The display panel of claim 13, wherein an operation of the second transistor is controlled by a first type scan signal in the plurality of first type scan signals, and
wherein an operation of the third transistor is controlled by a second type scan signal in the plurality of second type scan signals.

15. The display panel of claim 13, wherein an operation of the second transistor is controlled by a second type scan signal of the plurality of second type scan signals, and
wherein an operation of the third transistor is controlled by a first type scan signal in the plurality of first type scan signals.

16. An electronic device comprising: a display panel, having a display area and a non-display area adjacent to the display area; and a data driver electrically connected to the display panel, wherein the display panel includes: a plurality of pixels arranged in the display area along a first direction; a data line electrically connected to the plurality of pixels and the data driver; a first type stage disposed in the non-display area, configured to output a plurality of first type scan signals to the plurality of pixels, and including a plurality of first buffer circuits; a second type stage disposed in the non-display area, configured to output a plurality of second type scan signals to the plurality of pixels, and including a plurality of second buffer circuits; and a plurality of carry clock lines disposed between the plurality first buffer circuits and the plurality of second buffer circuits, and extending in the first direction, wherein the first type stage and the second type stage are spaced apart from each other in a second direction crossing the first direction.

17. The electronic device of claim 16, wherein each first buffer circuit in the plurality of first buffer circuits is configured to output a first type scan signal in the plurality of first type scan signals respectively, wherein each second buffer circuit in the plurality of second buffer circuits is configured to output a second type scan signal in the plurality of second type scan signals respectively, wherein the plurality of first buffer circuits are arranged along the first direction, and wherein the plurality of second buffer circuits are arranged along the first direction.

18. The electronic device of claim 17, wherein the display panel further includes: a plurality of first type clock lines electrically connected to the first type stage; and a plurality of second type clock lines electrically connected to the second type stage, and wherein the first type clock lines and the second type clock lines are spaced apart from each other in the second direction, and the plurality of carry clock lines are disposed between the plurality of first type clock lines and the plurality second type clock lines.

19. The electronic device of claim 18, wherein the plurality of first type clock lines, the first type stage, the plurality of carry clock lines, the second type stage, the plurality of second type clock lines, and the plurality of pixels are sequentially arranged along the second direction, and
wherein the display panel further includes a voltage line disposed between the plurality of second type clock lines and the plurality of pixels, and the voltage line extends along the first direction.

20. The electronic device of claim 17, wherein the display panel further includes a plurality of signal lines electrically connected to the first type stage and the second type stage, a first connection line extending along the second direction, and a second connection line spaced apart from the first connection line in the second direction and extending along the second direction,
wherein the plurality of signal lines are disposed between the plurality of first buffer circuits and the plurality of second buffer circuits, and
wherein the first connection line is electrically connected to a first signal line in the plurality of signal lines and the first type stage, and the second connection line is electrically connected to the first signal line in the plurality of signal lines and the second type stage.

* * * * *